United States Patent
Zhang et al.

(10) Patent No.: US 8,989,004 B2
(45) Date of Patent: Mar. 24, 2015

(54) SYSTEM AND METHOD FOR MULTI-POINT HSDPA COMMUNICATION UTILIZING A MULTI-LINK PDCP SUBLAYER

(75) Inventors: Danlu Zhang, San Diego, CA (US); Rohit Kapoor, San Diego, CA (US); Bibhu Prasad Mohanty, San Diego, CA (US); Weiyan Ge, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/291,037

(22) Filed: Nov. 7, 2011

(65) Prior Publication Data

US 2012/0281564 A1    Nov. 8, 2012

Related U.S. Application Data

(60) Provisional application No. 61/411,245, filed on Nov. 8, 2010.

(51) Int. Cl.
*H04L 1/00* (2006.01)
*H04L 12/26* (2006.01)
(Continued)

(52) U.S. Cl.
CPC .............. *H04W 28/10* (2013.01); *H04L 1/08* (2013.01); *H04L 1/1867* (2013.01); *H04L 1/20* (2013.01); *H04L 2001/0092* (2013.01); *H04W 24/10* (2013.01); *H04W 88/06* (2013.01)
USPC ........... 370/231; 370/235; 370/349; 370/394; 370/412; 370/469; 455/453; 709/230; 709/238

(58) Field of Classification Search
CPC ....... H04L 1/08; H04L 1/1867; H04W 28/10; H04W 88/06; H04W 24/10
USPC ......... 370/328, 329, 331, 352, 231, 235, 349, 370/394, 412, 469; 455/453; 709/230, 238
See application file for complete search history.

(56) References Cited

U.S. PATENT DOCUMENTS

| | | | |
|---|---|---|---|
| 7,242,670 B2 | 7/2007 | Yi et al. | |
| 7,551,596 B2 | 6/2009 | Kim et al. | |

(Continued)

FOREIGN PATENT DOCUMENTS

| | | |
|---|---|---|
| CN | 101720562 A | 6/2010 |
| EP | 1284583 A2 | 2/2003 |

(Continued)

OTHER PUBLICATIONS

CATT: "Measurement in CA", 3GPP Draft; R2-095485, 3rd Generation Partnership Project (3GPP), Mobile Competence Centre ; 650, Route Des Lucioles ; F06921 Sophia-Antipolis Cedex ; France, no. Miyazaki; Oct. 12, 2009, Oct. 16, 2009, XP050390041, [retrieved on Oct. 4, 2009] paragraphs [02.2], [02.3].

(Continued)

*Primary Examiner* — Alpus H Hsu
*Assistant Examiner* — Anthony Luo
(74) *Attorney, Agent, or Firm* — Darren M. Simon

(57) ABSTRACT

A method and apparatus for wireless communication may provide a multi-link PDCP sublayer in a radio network controller capable of allocating PDCP PDUs among a plurality of RLC entities for use in a multi-point HSDPA network. Some aspects of the disclosure address issues relating to out-of-order delivery of the PDCP PDUs to a UE, such as unnecessary retransmissions. That is, the disclosed multi-link PDCP may be capable of distinguishing between sequence number gaps that are caused by physical layer transmission failures and those caused merely by skew.

20 Claims, 13 Drawing Sheets

(51) Int. Cl.

| | | |
|---|---|---|
| H04J 3/24 | (2006.01) | |
| H04L 12/28 | (2006.01) | |
| H04W 72/00 | (2009.01) | |
| G06F 15/173 | (2006.01) | |
| H04L 1/18 | (2006.01) | |
| H04W 28/10 | (2009.01) | |
| H04L 1/08 | (2006.01) | |
| H04L 1/20 | (2006.01) | |
| H04W 24/10 | (2009.01) | |
| H04W 88/06 | (2009.01) | |

(56) References Cited

U.S. PATENT DOCUMENTS

| | | | |
|---|---|---|---|
| 7,710,922 B2 | 5/2010 | Lundh et al. | |
| 7,729,349 B2 | 6/2010 | Beckmann et al. | |
| 7,864,722 B2 | 1/2011 | Yi et al. | |
| 7,903,578 B2* | 3/2011 | Fischer | 370/252 |
| 7,944,943 B2 | 5/2011 | Kekki et al. | |
| 7,961,704 B2 | 6/2011 | Meyer et al. | |
| 8,068,473 B2 | 11/2011 | Chun et al. | |
| 8,068,497 B2 | 11/2011 | Terry et al. | |
| 8,094,618 B2 | 1/2012 | Yi et al. | |
| 8,144,662 B2* | 3/2012 | Xing et al. | 370/331 |
| 8,638,773 B2 | 1/2014 | Ho et al. | |
| 2002/0021714 A1 | 2/2002 | Seguin | |
| 2003/0129982 A1 | 7/2003 | Perini | |
| 2003/0171118 A1 | 9/2003 | Miya | |
| 2003/0198204 A1 | 10/2003 | Taneja et al. | |
| 2004/0013089 A1 | 1/2004 | Taneja et al. | |
| 2004/0224691 A1 | 11/2004 | Hadad | |
| 2005/0044130 A1* | 2/2005 | Sillasto et al. | 709/200 |
| 2005/0074024 A1 | 4/2005 | Kim et al. | |
| 2006/0033323 A1 | 2/2006 | Reynolds | |
| 2006/0126507 A1 | 6/2006 | Nakayasu | |
| 2006/0203760 A1 | 9/2006 | Fukui et al. | |
| 2006/0274712 A1 | 12/2006 | Malladi et al. | |
| 2006/0276214 A1 | 12/2006 | Harris et al. | |
| 2007/0008990 A1 | 1/2007 | Torsner | |
| 2007/0104150 A1 | 5/2007 | Fernandez-Corbaton et al. | |
| 2008/0069043 A1 | 3/2008 | Kimura et al. | |
| 2008/0132263 A1 | 6/2008 | Yu et al. | |
| 2008/0225789 A1* | 9/2008 | Kim et al. | 370/329 |
| 2008/0298322 A1 | 12/2008 | Chun et al. | |
| 2008/0298332 A1 | 12/2008 | Erami | |
| 2009/0010213 A1 | 1/2009 | Yamada et al. | |
| 2009/0036061 A1 | 2/2009 | Chun et al. | |
| 2009/0041001 A1 | 2/2009 | Lee et al. | |
| 2009/0103445 A1* | 4/2009 | Sammour et al. | 370/252 |
| 2009/0193310 A1* | 7/2009 | Hashimoto | 714/749 |
| 2009/0213729 A1 | 8/2009 | Zhang et al. | |
| 2009/0219881 A1 | 9/2009 | Kim | |
| 2009/0245178 A1 | 10/2009 | Gholmieh et al. | |
| 2009/0245212 A1 | 10/2009 | Sambhwani et al. | |
| 2009/0257387 A1 | 10/2009 | Gholmieh et al. | |
| 2009/0270103 A1 | 10/2009 | Pani et al. | |
| 2009/0296643 A1 | 12/2009 | Cave et al. | |
| 2009/0296798 A1 | 12/2009 | Banna et al. | |
| 2009/0300456 A1 | 12/2009 | Pelletier et al. | |
| 2009/0310534 A1 | 12/2009 | Lindskog et al. | |
| 2009/0323639 A1 | 12/2009 | Kim et al. | |
| 2009/0327830 A1 | 12/2009 | Lee et al. | |
| 2010/0002645 A1 | 1/2010 | Ke et al. | |
| 2010/0034087 A1 | 2/2010 | De Benedittis et al. | |
| 2010/0034114 A1 | 2/2010 | Kim et al. | |
| 2010/0034169 A1* | 2/2010 | Maheshwari et al. | 370/331 |
| 2010/0034171 A1 | 2/2010 | Pelletier et al. | |
| 2010/0034176 A1 | 2/2010 | Heo et al. | |
| 2010/0067483 A1* | 3/2010 | Ahluwalia | 370/331 |
| 2010/0110985 A1 | 5/2010 | Umesh et al. | |
| 2010/0118723 A1 | 5/2010 | Pani et al. | |
| 2010/0130137 A1 | 5/2010 | Pelletier et al. | |
| 2010/0165830 A1 | 7/2010 | Amir et al. | |
| 2010/0222059 A1 | 9/2010 | Pani et al. | |
| 2010/0233962 A1 | 9/2010 | Johansson et al. | |
| 2010/0238803 A1 | 9/2010 | Racz et al. | |
| 2010/0238829 A1 | 9/2010 | Sambhwani et al. | |
| 2010/0265883 A1 | 10/2010 | Attar et al. | |
| 2010/0296511 A1 | 11/2010 | Prodan et al. | |
| 2010/0303054 A1 | 12/2010 | Yang et al. | |
| 2011/0038313 A1* | 2/2011 | Park et al. | 370/328 |
| 2011/0044168 A1 | 2/2011 | Nadas et al. | |
| 2011/0044297 A1 | 2/2011 | Lee et al. | |
| 2011/0122962 A1* | 5/2011 | De Pasquale et al. | 375/267 |
| 2011/0164560 A1 | 7/2011 | Ki et al. | |
| 2011/0170495 A1 | 7/2011 | Earnshaw et al. | |
| 2011/0222502 A1 | 9/2011 | Aminaka | |
| 2011/0228756 A1 | 9/2011 | Kim et al. | |
| 2011/0235519 A1 | 9/2011 | Racz et al. | |
| 2011/0235528 A1 | 9/2011 | Racz et al. | |
| 2011/0317642 A1 | 12/2011 | Eravelli et al. | |
| 2011/0317657 A1* | 12/2011 | Chmiel et al. | 370/331 |
| 2012/0039169 A1 | 2/2012 | Susitaival et al. | |
| 2012/0057560 A1 | 3/2012 | Park et al. | |
| 2012/0082096 A1 | 4/2012 | Cave et al. | |
| 2012/0163161 A1 | 6/2012 | Zhang et al. | |
| 2012/0163205 A1 | 6/2012 | Zhang et al. | |
| 2012/0163315 A1 | 6/2012 | Govindappa et al. | |
| 2012/0163338 A1 | 6/2012 | Zhang et al. | |
| 2012/0201219 A1* | 8/2012 | Wager et al. | 370/329 |
| 2012/0201226 A1 | 8/2012 | Sambhwani et al. | |
| 2012/0320867 A1 | 12/2012 | Sarkkinen et al. | |
| 2013/0016841 A1 | 1/2013 | Fong et al. | |
| 2013/0121247 A1 | 5/2013 | Seo et al. | |
| 2013/0155923 A1 | 6/2013 | Yi et al. | |
| 2013/0194921 A1 | 8/2013 | Zhang et al. | |
| 2013/0194924 A1 | 8/2013 | Zhang et al. | |
| 2014/0056238 A1 | 2/2014 | Nammi et al. | |
| 2014/0112255 A1 | 4/2014 | Kim et al. | |
| 2014/0153520 A1 | 6/2014 | Shinohara et al. | |

FOREIGN PATENT DOCUMENTS

| | | |
|---|---|---|
| EP | 1523134 A1 | 4/2005 |
| EP | 1672845 A1 | 6/2006 |
| EP | 1675426 A2 | 6/2006 |
| EP | 1773009 A2 | 4/2007 |
| EP | 1868394 A1 | 12/2007 |
| EP | 1950903 A1 | 7/2008 |
| EP | 2015526 A2 | 1/2009 |
| JP | 2005304060 A | 10/2005 |
| JP | 2008053851 A | 3/2008 |
| JP | 2010028714 A | 2/2010 |
| JP | 2010515357 A | 5/2010 |
| JP | 2010530197 A | 9/2010 |
| JP | 2011525336 A | 9/2011 |
| JP | 2013543706 A | 12/2013 |
| WO | WO0230144 A1 | 4/2002 |
| WO | WO03017711 A1 | 2/2003 |
| WO | 2005041493 A1 | 5/2005 |
| WO | WO2006103136 A1 | 10/2006 |
| WO | 2007050238 A1 | 5/2007 |
| WO | 2008085351 A1 | 7/2008 |
| WO | WO2008097544 A2 | 8/2008 |
| WO | 2008156268 A2 | 12/2008 |
| WO | 2009108808 | 9/2009 |
| WO | WO2009155480 A1 | 12/2009 |
| WO | 2010064365 A1 | 6/2010 |
| WO | 2010088538 | 8/2010 |
| WO | 2010106663 A1 | 9/2010 |
| WO | 2010125738 A1 | 11/2010 |
| WO | WO2010132186 A1 | 11/2010 |

OTHER PUBLICATIONS

David Soldani et al: "Strategies for Mobile Broadband Growth: Traffic Segmentation for Better Customer Experience", Vehicular Technology Conference (VTC Spring), 2011 IEEE 73rd, IEEE, May 15, 2011, pp. 1-5, XP031896606, DOI : 10.1109/VETECS. 2011.5956203 ISBN: 978-1-4244-8332-7.

Ericsson: "Iub and Iur Congestion Control Concept for HSUPA and HSDPA", 3GPP Draft; R3-050545 Iubiur Cong CTRL Disc, 3rd

(56) References Cited

OTHER PUBLICATIONS

Generation Partnership Project (3GPP), Mobile Competence Centre ; 650, Route Des Lucioles ; F-06921 Sophia Antipolis Cedex ; France, vol. RAN WG3, no. Athens, Greece; May 4, 2005, XP050157970, [retrieved on May 4, 2005].
International Search Report and Written Opinion—PCT/US2011/059819—ISA/EPO—Feb. 22, 2012.
Nokia: "Number of Control Symbols", 3GPP Draft; R2-071227 Number of Control Symbols, 3rd Generation Partnership Project (3GPP), Mobile Competence Centre ; 650, Route Des Lucioles ; F-06921 Sophia-Antipolis Cedex ; France, vol. RAN WG2, no. S t . Juliana s, Malta; Mar. 22, 2007, XP050602966, [retrieved on Mar. 22, 2007].
Nokia Siemens Networks et al: "Multi-cell transmission techniques for HSDPA", 3GPP Draft; R1-104913, 3rd Generation Partnership Project (3GPP), Mobile Competence Centre ; 650, Route Des Lucioles ; F-06921 Sophia-Antipolis Cedex ; France, vol. RAN WG1, no. Madrid, Spain; Aug. 23, 2010, Aug. 17, 2010, XP050450059, [retrieved on Aug. 17, 2010] paragraphs [003.], [03.5], [04.1].
QUALCOMM Incorporated: "On Inter-site Multi-Point Transmission in HSDPA", 3GPP Draft; R2-115196 on Inter-Site Multi-Point Transmisston in HSDPA, 3rd Generation Partnership Project (3GPP) , Mobile Competence Centre ; 650, Route Des Lucioles ; F-06921 Sophia-Antipolis Cedex ; France, vol. RAN WG2, no. Zhuhai; Oct. 10, 2011, Oct. 4, 2011, XP050540985, [retrieved on Oct. 4, 2011] paragraphs [02.3] , [0003] figure 2; table 1.
QUALCOMM Incorporated: "TCP Performance Evaluation of SF-DC Inter NodeB Aggregation Assuming Realistic RLC, Flow Control and Iub Congestions Control", 3GPP Draft; R1-112686_TCP_Perf_Eval_SF_DC_Inter_NodeB_Realistic_RLC_FC_CC, 3rd Generation Partnership Project (3GPP), Mobi Le Competence Centre ; 650, Route Des Lucioles ; F-06921 Sophia-Antipolis Cedex ; France, vol. RAN WG1, no. Athens, Greece; Aug. 22, 2011, Aug. 16, 2011, XP050537724, [retrieved on Aug. 16, 2011].
Anand J, et al: "Architecture, implementation, and evaluation of a concurrent multi-path real-time transport control protocol," Military Communications Conference, 2007. MILCOM 2007. IEEE. IEEE, Piscataway, NJ, USA, Oct. 29, 2007, pp. 1-7, XP031232821, Introduction sections II.A and II.B.
CATT: "Implicit Feedback in Support of Downlink CoMP", 3GPP Draft; RI-093522, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351782,[retrieved on Aug. 19, 2009] paragraphs 2.1 to 2.2.
Dong, Yu, et al: "A concurrent transmission control protocol," Communications, Circuits, and Systems Proceedings, 2006 International Conference on, IEEE, PI, Jun. 1, 2006, pp. 1796-1800, XP031010769, abstract, section II.
ETSI: "Digital cellular telecommunications system (Phase 2+),General Packet Radio Service (GPRS), Mobile Station (MS)—Base Station System (BSS) interface, Radio Link Control/ Medium Access Control (RLC/MAC) protocol (GSM 04.60 proposed version 1.1.0)", GSM 04.60, Feb. 19, 1998, pp. 48-51, XP000002657121, Retrieved from the Internet: URL:ww.etsi.org [retrieved on Aug. 18, 2011].
MCC Support: "Final Report of 3GPP TSG RAN WG1 #56bis v2.0.0 (Seoul, South Korea, Mar. 23 27, 2009)",3GPP Draft; Final-ReportWG1#56B-V200, 3rd Generation Partnership Project (3GPP), Mobile Competence Centre ; 650, Route Des Lucioles ; F-06921 Sophia-Antipolis Cedex France, San Francisco, USA; May 5, 2009, XP050339215,[ retrived on May 5, 2009] p. 11-p. 13-p. 14 p. 43-p. 44 p. 54-p. 55.
Nadas et al., "Providing Congestion Control in the Iub Transport Network for HSDPA," Global Telecommunications Conference 2007, Ericsson Research, GLOBECOM '07, IEEE, Nov. 26-30, 2007, 5 pages.
QUALCOMM Europe: "TP for feedback in support of DL CoMP for LTEA TR", 3GPP Draft; R1-092290 TP for TR 36.814 on DL Comp Feedback, 3rd Generation Partnership Project (3GPP), Mobile Competence Centre ; 650, Route Des Lucioles ; F-06921 Sophia-Antipolis Cedex; France, no. San Francisco, USA; Jun. 9, 2009 XP050339699, [retrieved on Jun. 9, 2009].
QUALCOMM Incorporated: "DL Scheduling, RLC and Flow Control assumption for Inter-NodeB Multi-Point Transmissions", 3GPP Draft; R1-110126_DL_SCH_RLC_Flow_Control_Ass_Inter-NodeB_MP-HSDPA, 3rd Generation Partnership Project (3GPP), Mobile Competence Centre ; 650, Route Des Lucioles ; F-06921 Sophia-Antipolis Cedex ;France, vol. RAN WG1, no. Dublin, Ireland; Jan. 17, 2011, Jan. 11, 2011, XP0504734375.
QUALCOMM Incorporated: "On deploying DC-HSDPA UEs in Single Frequency Networks", R1-104157, 3rd Generation Partnership Project (3GPP), Mobile Competence Centre ; 650, Route Des Lucioles ; F-06921 Sophia-Antipolis Cedex ; France, vol. RAN-WG1, no. Dresden, Germany; Jun. 29, 2010 Jul. 5, 2010, XP002633072, Retrieved from the Internet: URL:http://www.3gpp.org/ftp/tsg_ran/WG1_RL 1/TSGR1_61b/Docs/R1-104157.zip [retrieved on Apr. 14, 2011].
Samsung: "Selection of primary scheduling Node B in SHO", 3GPP Draft; R1-040492, 3rd Generation Partnership Project (3GPP), Mobile Competence Centre ; 650, Route Des Lucioles ; F-06921 Sophia-Antipolis Cedex ; France, vol. RAN WG1, no. Montreal, Canada; May 6, 2004, XP050098858.
Sharp, "Simultaneous Retransmission of Different Redundancy Versions during the HARQ for DL CoMP," 3GPP TSG-RAN WG1#58Bis, R1-094026, Miyazaki, Japan, Oct. 12-16, 2009, pp. 1-3.
Vulkan et al., "Congestion Control in Evolved HSPA Systems," 2011 IEEE 73rd Vehicular Technology Conference (VTC Spring), pp. 1-6.
Sandrasegaran K., et al., "Delay-Prioritized Scheduling (DPS) for Real Time Traffic in 3GPP LTE System", IEEE Wireless Communications and Networking Conference (WCNC), pp. 1-6, 2010.
GSM: "Digital cellular telecommunications system (Phase 2+), General Packet Radio Service (GPRS), Mobile Station (MS)—Base Station System (BSS) interface, Radio Link Control/ Medium Access Control (RLC/MAC) protocol (GSM 04.60 proposed version 6.1.0, Release 1997)", Draft EN 301 349 V6.1.0 Aug. 1998, Aug. 1988, pp. 1-152.
QUALCOMM Incorporated: "On deploying DC-HSDPA UEs in Single Frequency Networks", 3GPP TSG-RAN WG1#61b R1-103859, Jun. 21, 2010.
3GPP., "System performance of SFDC-HSDPA"; R1-106393, 3GPP TSG RAN WG1 Meeting #63; R1-106393; Jacksonville, USA, Nov. 15-19, 2010; pp. 01-07.
Gomes J.S., et al., Integrating Admission Control and Packet Scheduling for Quality Controlled Streaming Services in HSDPA Networks; Broadband Communications, Networks and Systems, pp. 567-573, 2007.
Necker M.C., et al., "Parameter Selection for HSDPA Iub Flow Control," Wireless Communication Systems, 2005. 2nd International Symposium on, vol., no., pp. 233,237, 7—Sep. 7, 2005 DOI: 10.1109/ISWCS.2005.1547693.

\* cited by examiner

SYSTEM AND METHOD FOR MULTI-POINT HSDPA COMMUNICATION UTILIZING A MULTI-LINK PDCP SUBLAYER

CROSS-REFERENCE TO RELATED APPLICATIONS

This application claims priority to and the benefit of provisional patent application No. 61/411,245, filed in the United States Patent and Trademark Office on Nov. 8, 2010, the entire content of which is incorporated herein by reference.

BACKGROUND

1. Field

Aspects of the present disclosure relate generally to wireless communication systems, and more particularly, to PDCP-layer algorithms for managing packets sent over a plurality of downlink cells for aggregation.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

As an example, Multi-Point HSDPA has been recently introduced, in which multiple cells can provide high-speed downlinks within the same carrier frequency to a mobile station, such that the mobile station is capable of aggregating the transmissions from those cells. In one example of a Multi-Point HSDPA system, multiple MAC layer links exist: each serving cell manages its own MAC entity, with respective links to a mobile station that includes a corresponding number of MAC entities, one for each serving cell. In this scheme, it is possible that the packets received at the mobile station over the multiple MAC layer links can skew, or arrive out of order according to their respective sequence numbers. If unchecked, this skew can result in unnecessary retransmissions of packets. Therefore, there is a need for protocols for Multi-Point HSDPA networks capable of addressing this skew in a way that is mindful of the potential skew and can handle it without triggering unneeded retransmissions.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure, nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication operable at a user equipment. Here, the method may include steps such as receiving at least a portion of a PDCP flow from each of a plurality of base stations and reordering PDCP PDUs corresponding to the PDCP flow according to a PDCP sequence number in each of the PDCP PDUs.

In another aspect, the disclosure provides a method of wireless communication operable at a radio network controller. Here, the method may include steps such as allocating, from a single PDCP entity, a plurality of packets among a plurality of RLC entities, assigning a PDCP sequence number to each of the packets and sending the plurality of packets to the plurality of RLC entities according to the allocation.

In another aspect, the disclosure provides a user equipment (UE) configured for wireless communication. Here, the UE may include means for receiving at least a portion of a PDCP flow from each of a plurality of base stations and means for reordering PDCP PDUs corresponding to the PDCP flow according to a PDCP sequence number in each of the PDCP PDUs.

In another aspect, the disclosure provides a radio network controller (RNC) configured for wireless communication. Here, the RNC may include means for allocating, from a single PDCP entity, a plurality of packets among a plurality of RLC entities, means for assigning a PDCP sequence number to each of the packets, and means for sending the plurality of packets to the plurality of RLC entities according to the allocation.

In another aspect, the disclosure provides a computer program product operable at a UE. The computer program product includes a computer-readable medium having instructions for causing a computer to receive at least a portion of a PDCP flow from each of a plurality of base stations, and to reorder PDCP PDUs corresponding to the PDCP flow according to a PDCP sequence number in each of the PDCP PDUs.

In another aspect, the disclosure provides a computer program product operable at an RNC. The computer program product includes a computer-readable medium having instructions for causing a computer to allocate, from a single PDCP entity, a plurality of packets among a plurality of RLC entities, to assign a PDCP sequence number to each of the packets; and to send the plurality of packets to the plurality of RLC entities according to the allocation.

In another aspect, the disclosure provides a UE configured for wireless communication. Here, the UE includes a receiver for receiving downlink transmissions from at least one base station, a transmitter for transmitting uplink transmissions to the at least one base station, at least one processor for controlling the receiver and the transmitter, and a memory coupled to the at least one processor. The at least one processor is configured to receive at least a portion of a PDCP flow from each of a plurality of base stations and to reorder PDCP PDUs corresponding to the PDCP flow according to a PDCP sequence number in each of the PDCP PDUs.

In another aspect, the disclosure provides an RNC configured for wireless communication. Here, the RNC includes a plurality of communication interfaces for communicating with a respective plurality of RLC entities, at least one processor for controlling the plurality of communication interfaces, and a memory coupled to the at least one processor. The at least one processor is configured to allocate, from a single PDCP entity, a plurality of packets among the plurality of RLC entities, to assign a PDCP sequence number to each of the packets, and to send the plurality of packets to the plurality of RLC entities according to the allocation.

To the accomplishment of the foregoing and related ends, the one or more aspects of the disclosure described herein may include the features hereinafter fully described and particularly pointed out in the claims. The following description and the annexed drawings set forth in detail certain illustrative features of the one or more aspects of the disclosure. These features are indicative, however, of but a few of the various ways in which the principles of various aspects of the disclosure may be employed, and this description is intended to include all such aspects of the disclosure, and their equivalents.

DETAILED DESCRIPTION

Figure 1:
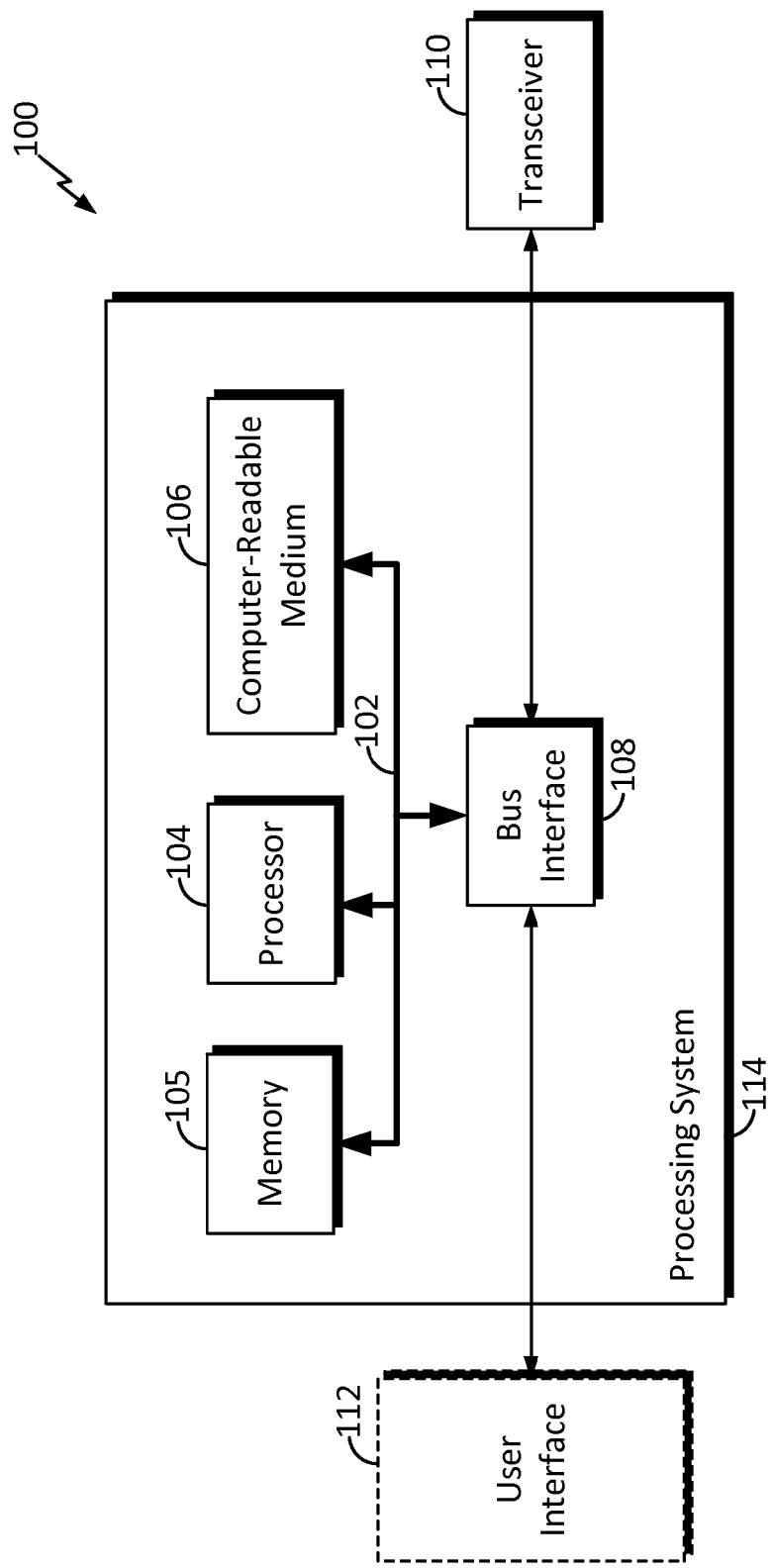
FIG. 1 is a block diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some aspects of the present disclosure provide a PDCP layer protocol that addresses issues relating to skew, that is, packets that may arrive out of order in a wireless communication network that implements soft aggregation. Here, the PDCP layer overlies multiple RLC links, one for each cell being aggregated at a user equipment. In a further aspect of the disclosure, multiple logical channels may be configured for the same data application. In this way, packets corresponding to each RLC layer may be transmitted on either cell, providing improvements relating to mobility for the UE.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Here, "medium" may include any media that facilitates transfer of a computer program from one place to another. As an example, the software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, a memory 105, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
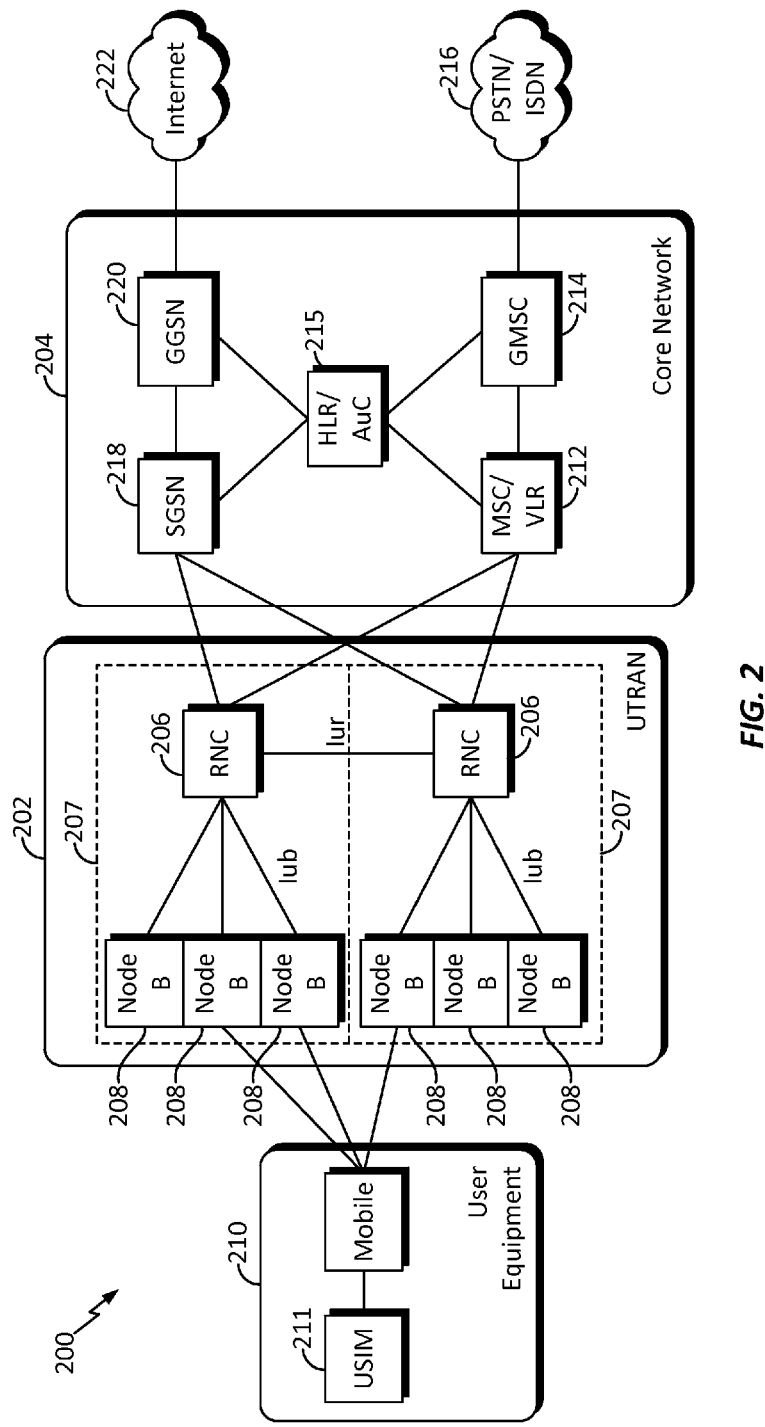
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, aspects of the present disclosure illustrated in FIG. 2 are presented with reference to a UMTS system 200 employing a W-CDMA air interface. A UMTS network includes three interacting domains: a core network 204, a UMTS terrestrial radio access network (UTRAN) 202, and user equipment (UE) 210. In this example, the UTRAN 202 may provide various wireless services including telephony, video, data, messaging, broadcasts, and/or other services. The UTRAN 202 may include a plurality of radio network subsystems (RNSs) such as an RNS 207, each controlled by a respective radio network controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three node Bs 208 are shown in each RNS 207; however, the RNSs 207 may include any number of wireless node Bs. The node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the node Bs 208. The downlink (DL), also called the forward link, refers to the communication link from a node B 208 to a UE 210, and the uplink (UL), also called the reverse link, refers to the communication link from a UE 210 to a node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a mobile services switching center (MSC), a visitor location register (VLR), and a gateway MSC (GMSC). Packet-switched elements include a serving GPRS support node (SGSN) and a gateway GPRS support node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum direct-sequence code division multiple access (DS-CDMA) system. The spread spectrum DS-CDMA spreads user data through multiplication by a sequence of pseudorandom bits called chips. The W-CDMA air interface for UMTS is based on such DS-CDMA technology and additionally calls for a frequency division duplexing (FDD). FDD uses a different carrier frequency for the uplink (UL) and downlink (DL) between a node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

Communication between the UE 210 and the node B 208 may be considered as including a physical (PHY) layer and a medium access control (MAC) layer. Further, communication between a UE 210 and an RNC 206 by way of a respective node B 208 may be considered as including a radio resource control (RRC) layer.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
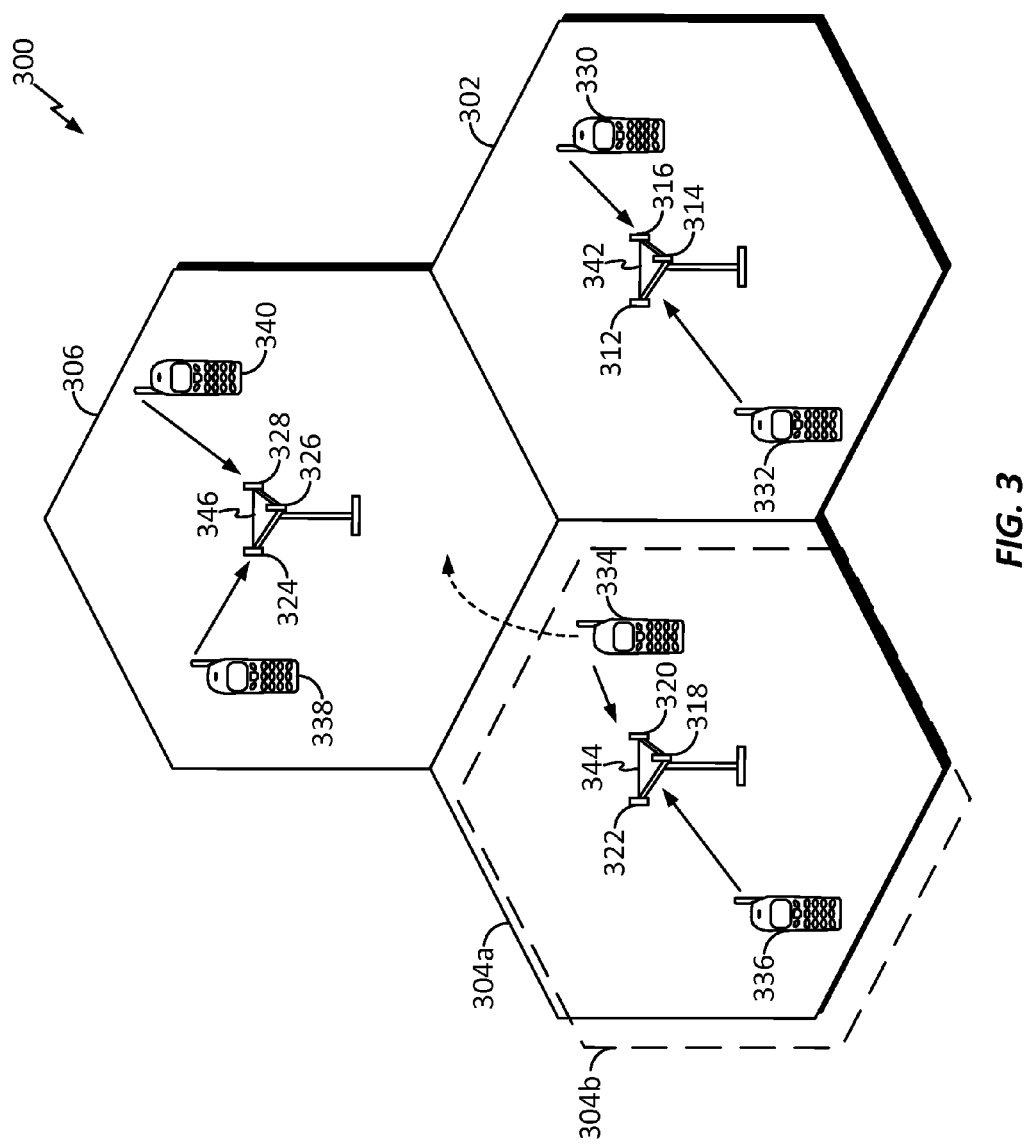
FIG. 3 is a conceptual diagram illustrating an example of an access network.

FIG. 3 illustrates by way of example and without limitation a simplified access network 300 in a UMTS terrestrial radio access network (UTRAN) architecture, which may utilize HSPA. The system includes multiple cellular regions (cells), including cells 302, 304, and 306, each of which may include one or more sectors. Cells may be defined geographically, e.g., by coverage area, and/or may be defined in accordance with a frequency, scrambling code, etc. That is, the illustrated geographically-defined cells 302, 304, and 306 may each be further divided into a plurality of cells, e.g., by utilizing different scrambling codes. For example, cell 304*a* may utilize a first scrambling code, and cell 304*b*, while in the same geographic region and served by the same node B 344, may be distinguished by utilizing a second scrambling code.

In a cell that is divided into sectors, the multiple sectors within a cell can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

The cells 302, 304 and 306 may include several UEs that may be in communication with one or more sectors of each cell 302, 304 or 306. For example, UEs 330 and 332 may be in communication with node B 342, UEs 334 and 336 may be in communication with node B 344, and UEs 338 and 340 may be in communication with node B 346. Here, each node B 342, 344, 346 is configured to provide an access point to a core network 204 (see FIG. 2) for all the UEs 330, 332, 334, 336, 338, 340 in the respective cells 302, 304, and 306.

During a call with the source cell 304*a*, or at any other time, the UE 336 may monitor various parameters of the source cell 304*a* as well as various parameters of neighboring cells such as cells 304*b*, 306, and 302. Further, depending on the quality of these parameters, the UE 336 may maintain some level of communication with one or more of the neighboring cells. During this time, the UE 336 may maintain an active set, that is, a list of cells that the UE 336 is simultaneously connected to (i.e., the UTRA cells that are currently assigning a downlink dedicated physical channel DPCH or fractional downlink dedicated physical channel F-DPCH to the UE 336 may constitute the active set).

Management of the active set can be enabled through the use of certain layer 3 radio resource control (RRC) messages between the RNC and UE. For example, the selection of cells to include in the active set may depend on certain UE measurements, which may be configured by the network in a system information block (SIB).

For example, the UE may measure a ratio between the signal strength and the noise floor ($E_c/I_0$) of a pilot signal (e.g., a common pilot channel CPICH) transmitted by each cell in the UE's monitored set. That is, the UE may determine the $E_c/I_0$ for nearby cells, and may rank the cells based on these measurements.

When the ranking of a cell changes, or if any other reporting trigger or measurement event (discussed in further detail below) occurs, the UE may send certain RRC messages to the RNC to report this event. Thus, the RNC may make a decision to alter the active set for the UE, and send an RRC message (i.e., an active set update message) to the UE indicating a change in the active set. The RNC may then communicate with the respective node B or node Bs, e.g., over an Iub interface utilizing node B application part (NBAP) signaling to configure the cells for communication with the UE. Finally, the RNC may communicate with the UE utilizing further RRC messages, such as a physical channel reconfiguration (PCR) message, with an RRC response from the UE of PCR complete, indicating success of the reconfiguration.

One reporting trigger may result when a primary CPICH enters the reporting range for the UE. That is, when the $E_c/I_0$ for a particular cell reaches a particular threshold (e.g., a certain number of dB below the $E_c/I_0$ of the primary serving cell) and maintains that level for a certain time such that it may be appropriate to add the cell to the Active Set a measurement event called Event 1A may occur.

Another reporting trigger may result when a primary CPICH leaves the reporting range. That is, when the $E_c/I_0$ for a particular cell falls below a particular threshold (e.g., a certain number of dB below the $E_c/I_0$ of the primary serving cell), and maintains that level for a certain time such that it may be appropriate to remove the cell from the Active Set a measurement event called Event 1B may occur.

Another reporting trigger may result when the Active Set is full, and a primary CPICH of a candidate cell outside the Active Set exceeds that of the weakest cell in the Active Set, such that it may be appropriate to replace the weakest cell in the Active Set with the candidate cell. Here, a measurement event called Event 1C may occur, causing a combined radio link addition and removal.

In Release 5 of the 3GPP family of standards, high speed downlink packet access (HSDPA) was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-DSCH may be associated with one or more HS-SCCH. The HS-SCCH is a physical channel that may be utilized to carry downlink control information related to the transmission of HS-DSCH. The UE may continuously monitor the HS-SCCH to determine when to read its data from the HS-DSCH, and the modulation scheme used on the assigned physical channel.

The HS-PDSCH is a physical channel that may be shared by several UEs. The HS-PDSCH may support quadrature phase shift keying (QPSK) and 16-quadrature amplitude modulation (16-QAM) and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Rel. 5 HSDPA, at any instance a UE has one serving cell, being the strongest cell in the active set as according to the UE measurements of $E_c/I_0$. According to mobility procedures defined in Rel. 5 of 3GPP TS 25.331, the radio resource control (RRC) signaling messages for changing the HSPDA serving cell are transmitted from the current HSDPA serving cell (i.e., the source cell), and not the cell that the UE reports as being the stronger cell (i.e., the target cell).

That is, in addition to the reporting triggers dealing with Event 1A and Event 1B, described above, for HSDPA, another reporting trigger may result when a neighbor cell (which may or may not be within the active set) exceeds the quality of the serving HS-DSCH cell according to the UE measurements of $E_c/I_0$. In this case it may be appropriate to re-select the serving HS-DSCH cell. Thus, a measurement event called Event 1D may be utilized to change the best serving HS-DSCH cell.

Release 8 of the 3GPP standards brought dual cell HSDPA (DC-HSDPA), which enables a UE to aggregate dual adjacent 5-MHz downlink carriers transmitted by a node B. The dual carrier approach provides higher downlink data rates and better efficiency at multicarrier sites. Generally, DC-HSDPA utilizes a primary carrier and a secondary carrier, where the primary carrier provides the channels for downlink data transmission and the channels for uplink data transmission, and the secondary carrier provides a second set of HS-PDSCHs and HS-SCCHs for downlink communication. Here, the primary carrier is generally the best serving HS-DSCH cell according to the UE measurements of $E_c/I_0$, and can be swapped with the secondary serving cell by utilizing the Event 1D measurement event. Further, Event 1A can be utilized in a multi-cell network to add a secondary serving cell without changing the primary serving cell; and Event 1B can be utilized to eliminate the secondary serving cell.

Figure 4:
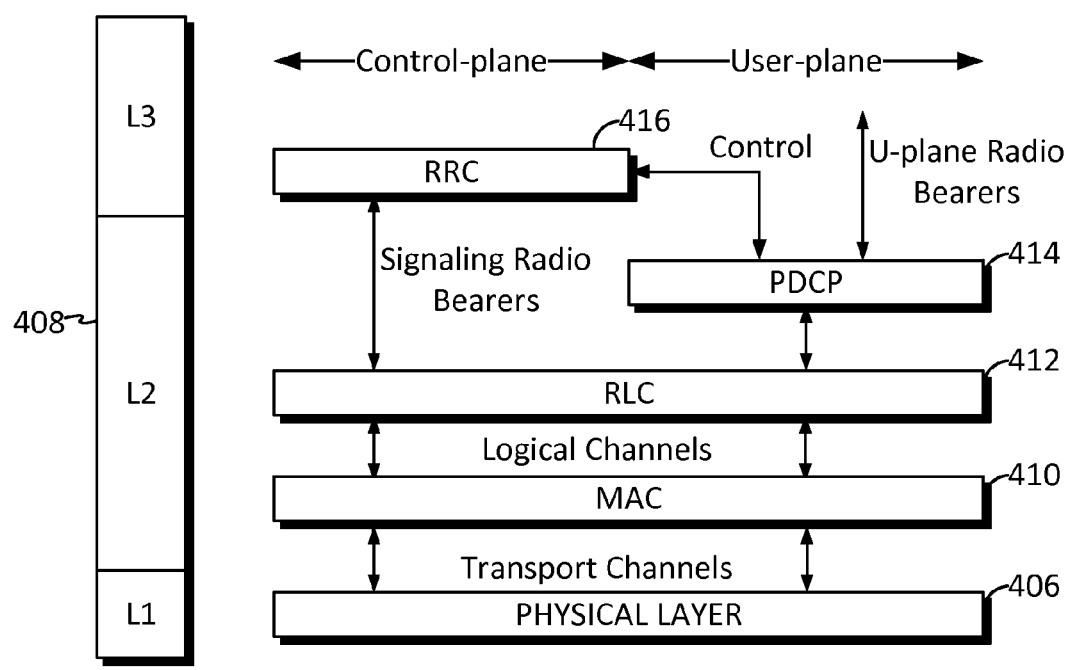
FIG. 4 is a conceptual diagram illustrating an example of a radio protocol architecture for the user and control plane.

The radio protocol architecture between the UE and the UTRAN may take on various forms depending on the particular application. An example for an HSPA system will now be presented with reference to FIG. 4, illustrating an example of the radio protocol architecture for the user and control planes between a UE and a node B. Here, the user plane or data plane carries user traffic, while the control plane carries control information, i.e., signaling.

Turning to FIG. 4, the radio protocol architecture for the UE and node B is shown with three layers: layer 1, layer 2, and layer 3. Layer 1 is the lowest layer and implements various physical layer signal processing functions. Layer 1 will be referred to herein as the physical layer 406. The data link layer, called layer 2 (L2 layer) 408 is above the physical layer 406 and is responsible for the link between the UE and node B over the physical layer 406.

At layer 3, the RRC layer 416 handles the control plane signaling between the UE and the node B. RRC layer 416 includes a number of functional entities for routing higher layer messages, handling broadcast and paging functions, establishing and configuring radio bearers, etc.

In the UTRA air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between node Bs.

The RLC sublayer 412 generally supports acknowledged, unacknowledged, and transparent mode data transfers, and provides segmentation and reassembly of upper layer data packets, retransmission of lost data packets, and reordering of data packets to compensate for out-of-order reception due to a hybrid automatic repeat request (HARD). That is, the RLC sublayer 412 includes a retransmission mechanism that may request retransmissions of failed packets.

To provide the RLC retransmission mechanism, RLC protocol data units (PDUs) generally include a parameter called an RLC sequence number. The RLC sequence number may take different formats in accordance with whether the UE is in unacknowledged mode or acknowledged mode, but in general, the acknowledged mode PDU is used to coordinate RLC retransmissions. At certain intervals a UE may send an RLC-sublayer PDU called a status PDU, which may include a field for one or more RLC sequence numbers that were not correctly received, as well as a length indicator indicating the length of a gap where RLC PDUs were not correctly received. Of course, the format of the status PDU may take other forms, such as including an explicit acknowledgment or negative acknowledgment (ACK/NACK) for each PDU, or any other suitable format. Here, if the RLC sublayer 412 is unable to deliver the data correctly after a certain maximum number of retransmissions or an expiration of a transmission time, upper layers are notified of this condition and the RLC SDU may be discarded.

The MAC sublayer 410 provides multiplexing between logical channels and transport channels. The MAC sublayer 410 is also responsible for allocating the various radio resources (e.g., resource blocks) in one cell among the UEs. The MAC sublayer 410 is also responsible for HARQ operations. The MAC sublayer 410 includes various MAC entities, including but not limited to a MAC-d entity and MAC-hs/ehs entity.

Figure 5:
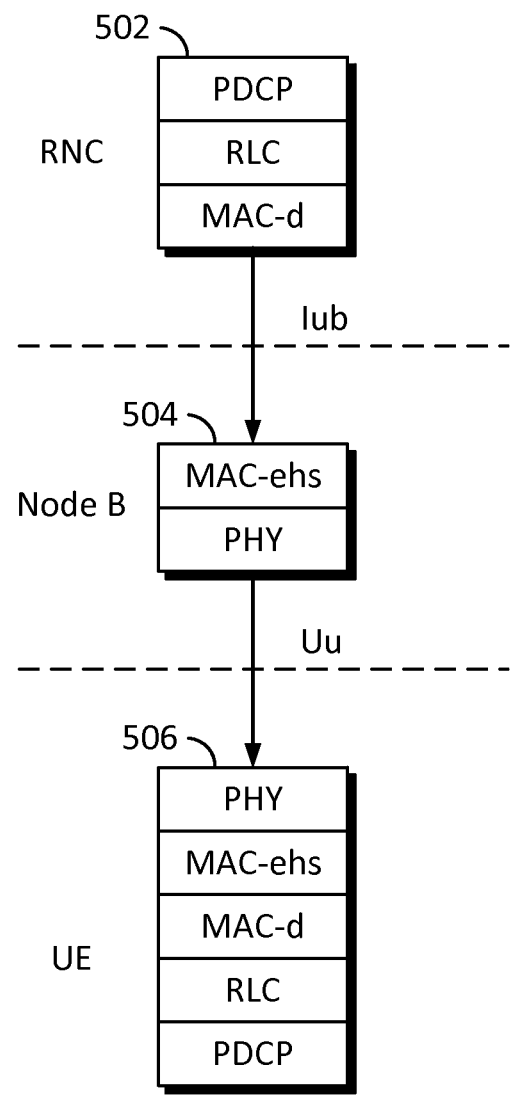
FIG. 5 is a conceptual diagram illustrating some of the layers utilized in a downlink path in an HSDPA network between an RNC and a UE.

FIG. 5 is a schematic illustration of a downlink path in an HSDPA network between an RNC 502 and a UE 506, passing through a node B 504, showing some of the sublayers at the respective nodes. Here, the RNC 502 may be the same as the RNC 206 illustrated in FIG. 2; the node B 504 may be the same as the node B 208 illustrated in FIG. 2; and the UE 506 may be the same as the UE 210 illustrated in FIG. 2. The RNC 502 houses protocol layers from MAC-d and above, including for example the RLC sublayer and the PDCP sublayer. For the high speed channels, a MAC-hs/ehs layer is housed in the node B 504. Further, a PHY layer at the node B 504 provides an air interface for communicating with a PHY layer at the UE 506, e.g., over an HS-DSCH.

From the UE 506 side, a MAC-d entity is configured to control access to all the dedicated transport channels, to a MAC-c/sh/m entity, and to the MAC-hs/ehs entity. Further, from the UE 506 side, the MAC-hs/ehs entity is configured to handle the HSDPA-specific functions and control access to the HS-DSCH transport channel. Upper layers configure which of the two entities, MAC-hs or MAC-ehs, is to be applied to handle HS-DSCH functionality.

As discussed above, DC-HSDPA provides for downlink carrier aggregation. The carrier aggregation achieved in 3GPP Release 8 DC-HSDPA and its subsequent enhancements provides benefits in terms of user experience, including latency reduction for bursty traffic.

According to aspects of the present disclosure, another form of aggregation, which may be referred to as soft aggregation, provides for downlink aggregation wherein the respective downlink cells utilize the same frequency carrier. Soft aggregation strives to realize similar gains to DC-HSDPA in a single-carrier network.

Figure 6:
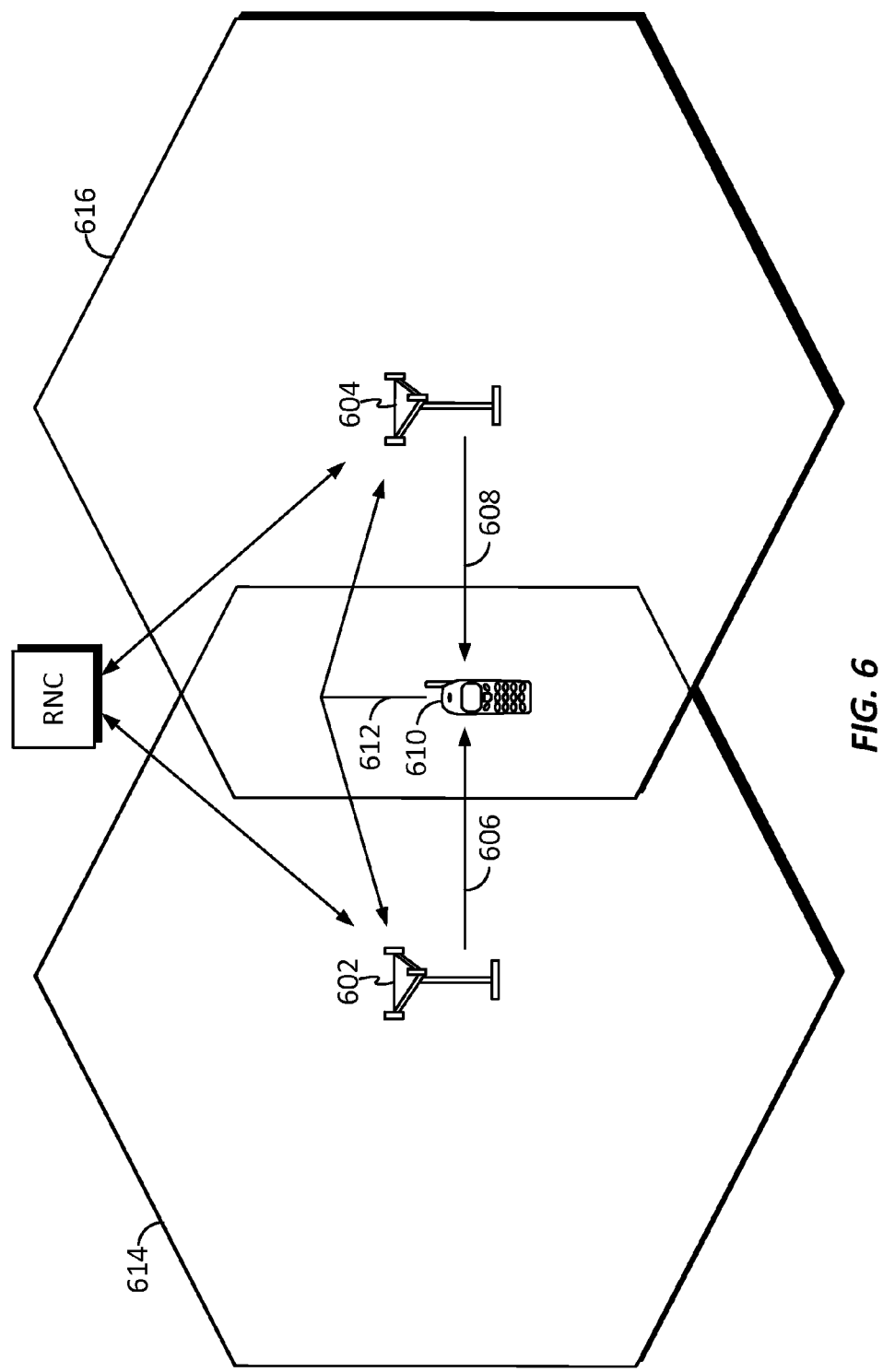
FIG. 6 is a block diagram illustrating a portion of a multi-point HSDPA network.

FIG. 6 illustrates an exemplary system for soft aggregation in accordance with some aspects of the present disclosure. In FIG. 6, there may be a geographic overlap between two or more cells 614 and 616, such that a UE 610 may be served, at least for a certain period of time, by the multiple cells. Thus, a wireless telecommunication system in accordance with the present disclosure may provide HSDPA service from a plurality of cells on a single frequency channel, such that a UE may perform aggregation. For example, a setup utilizing two or more cells may be referred to as single frequency dual cell HSDPA (SFDC-HSDPA), coordinated multi-point HSDPA (CoMP HSDPA), or simply multi-point HSDPA. However, other terminology may freely be utilized. In this way, users at cell boundaries, as well as the overall system, may benefit from a high throughput. In various examples, the different cells may be provided by the same node B, or the different cells may be provided by disparate node Bs.

In the scheme illustrated in FIG. 6, two node Bs 602 and 604 each provide a downlink cell 606 and 608, respectively, wherein the downlink cells are in substantially the same carrier frequency. Of course, as already described, in another example, both downlink cells 606 and 608 may be provided from different sectors of the same node B. The UE 610 receives and aggregates the downlink cells and provides an uplink channel 612, which may be received by one or both node Bs 602 and 604. The uplink channel 612 from the UE 610 may provide feedback information, e.g., corresponding to the downlink channel state for the corresponding downlink cells 606 and 608.

A DC-HSDPA-capable UE has two receive chains, each of which may be used to receive HS data from a different carrier. In a multi-point HSDPA-capable UE according to an aspect of the present disclosure, if the plural receive chains are made to receive HS data from different cells, at least some the benefits from aggregation can be realized in a single-carrier network.

In some aspects of the present disclosure, the cells being aggregated may be restricted to cells in the UE's active set. These cells may be the strongest cells in the active set, determined in accordance with the downlink channel quality. If the strongest cells reside in different node B sites, this scheme may be called 'soft aggregation'. If the strongest cells to be aggregated are different sectors residing in the same node B site, this scheme may be called 'softer aggregation.'

In a conventional DC-HSDPA or a softer aggregation multi-point HSDPA system wherein both cells are provided by a single node B, the two cells may share the same MAC-ehs entity in much the same way as the conventional HSDPA system illustrated in FIG. 5. Here, because the downlink data comes to the UE from different sectors of a single node B site, management of the transmission of the RLC PDUs is more straightforward and the RLC entity at the UE corresponding to a particular one of the downlinks may generally assume that the packets are sent in order in accordance with their respective RLC sequence numbers. Thus, any gap in RLC sequence numbers of received packets at the UE can be understood to be caused by a packet failure, and the UE may accordingly request retransmission of those packets. The RLC entity at the RNC may then simply retransmit all packets corresponding to the missing RLC sequence numbers.

The RLC layer in the UE generally makes sure that any physical layer losses are not felt by the upper layer. When utilized in a soft aggregation multi-point HSDPA system, the MAC entity at the UE cannot generally guarantee in-order delivery of data packets from multiple cells, because (as described above) various issues may occur at a subset of the cells providing the downlink streams, and HARQ retransmissions at the MAC layer may result in out-of-order packets. Thus, the RLC sublayer puts the received packets in order according to the RLC sequence numbers.

Figure 7:
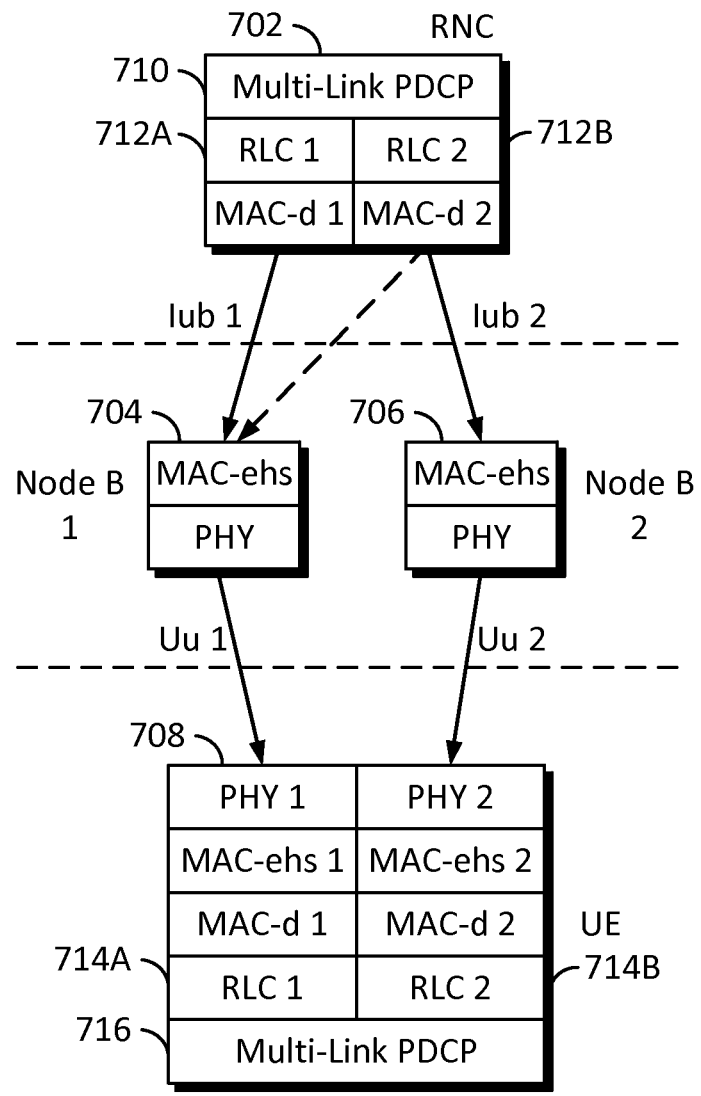
FIG. 7 is a conceptual diagram illustrating some of the layers utilized in a downlink path in a multi-point HSDPA network between an RNC having a multi-link PDCP layer and a UE.

FIG. 7 is a block diagram illustrating a portion of an exemplary multi-point HSDPA system in accordance with an aspect of the present disclosure, implementing multi-link PDCP. Although the illustrated system shows soft aggregation of two downlinks, various aspects of the present disclosure may equivalently be applied to any number of downlinks within the scope of the present description.

The illustrated RNC 702 includes a multi-link PDCP entity 710 configured to allocate a plurality of packets (e.g., PDCP PDUs) for a data application among a plurality of RLC entities 712A and 712B at the RNC 702. Here, the multi-link PDCP entity 710 may assign a PDCP sequence number to each of the packets. That is, current standards for the PDCP sublayer for HSDPA define a field and a coding to be utilized for a PDCP sequence number, however, those PDCP sequence numbers are only used occasionally, and are not utilized for a purpose related to reordering the packets when received at the UE. However, in an aspect of the present disclosure, a PDCP sequence number may be assigned to every PDCP PDU, so that reordering and skew management may be performed at the PDCP sublayer at the UE when the packets are received there, as described in further detail below.

Once the packets are allocated among the plural RLC entities 712A and 712B, these packets may then be provided over respective logical channels to corresponding node Bs 704 and 706. That is, in an aspect of the present disclosure, a plurality of logical channels, each of which may utilize a respective Iub interface (known to those of ordinary skill in the art) between the RNC 702 and the respective node Bs 704 and 706, may be configured for the data application utilizing the multi-link PDCP entity 710. In this way, each of the node Bs 704 and 706 utilized for transmitting the multi-point HSDPA, may be a part of its own RLC stream or RLC link corresponding to a portion of the data application.

With respect to the logical channels, the RLC entities 712A and 712B at the RNC 702 may each be mapped to a respective one of a plurality of node Bs 704 and 706. In accordance with some aspects of the present disclosure, the mapping between an RLC entity 712A or 712B at the RNC 702 and a node B 704 or 706 may be flexible, such that each of the multiple logical channels can be transmitted to either node B. As it will be described in further detail below, the flexible mapping from an RLC entity to particular cell can improve performance during various measurement events.

Each node B 704 and 706 further includes an air interface, which may be configured for HSDPA transmission for transmitting the packets received on the respective RLC stream to the UE 708. The UE 708 may include a plurality of receive chains at the physical and MAC layers, corresponding to the plurality of streams received from the respective node Bs 704 and 706. Further, in accordance with an aspect of the present disclosure, the UE 708 may include a plurality of RLC entities 714A and 714B for receiving and processing the packets corresponding to each of the plurality of RLC streams.

According to an aspect of the present disclosure, because each portion of the data flow utilizes its own RLC stream, the RLC may behave in much the same way as a conventional RLC entity with respect to any gaps in the RLC sequence numbers. That is, when a gap in RLC sequence numbers is found by one of the RLC entities 714 or 716 at the UE 708, the respective RLC entity at the UE 708 may infer that this gap represents a decoding or transmission failure, and may therefore request retransmission of the RLC PDU corresponding to the gap utilizing the appropriate RLC signaling such as the RLC status PDU.

Above the plural RLC entities 714A and 714B at the UE 708 lies a multi-link PDCP sublayer 716. In an aspect of the present disclosure, the multi-link PDCP sublayer 716 may be configured for reordering the received packets in accordance with the PDCP sequence numbers in each of the packets as assigned by the multi-link PDCP sublayer 710 at the RNC 702.

Figure 9:
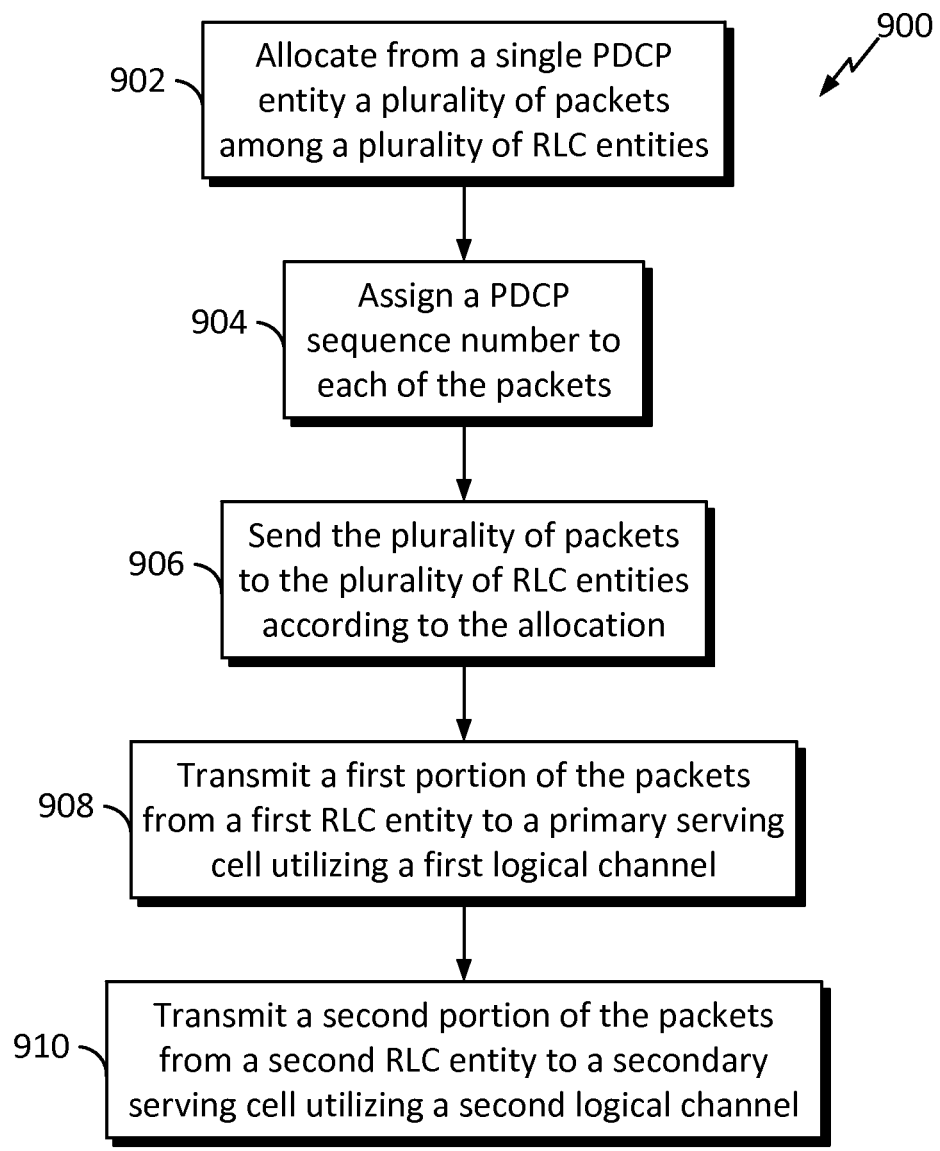
FIG. 9 is a flow chart illustrating an exemplary process of allocating and sending PDCP PDUs from a multi-link PDCP.

FIG. 9 is a flow chart illustrating an exemplary process 900 for multi-point HSDPA utilizing a multi-link PDCP layer, operable at a network node such as the RNC 702 in accordance with some aspects of the present disclosure. That is, in some examples, the process 900 may be performed by the RNC 702 or any suitable network node implementing an allocation of packets (e.g., PDCP PDUs) for a UE to a plurality of RLC entities. Further, the process 900 may be implemented by a processor 104 configured to perform the below-recited functions. In one non-limiting example described below, the process may be implemented at a PDCP sublayer of an RNC configured to provide packets for a multi-point HSDPA wireless communication system.

In block 902, the process may allocate, from a single PDCP entity 710, a plurality of packets among a plurality of RLC entities 712A and 712B. The plurality of RLC entities may reside at the RNC 702, along with the PDCP entity 710, and may be the starting points for respective RLC streams from the RNC 702 to a UE 708. As a part of these RLC streams, beneath each of the RLC entities 712A and 712B, resident at the RNC 702, corresponding MAC-d entities may provide logical interfaces between the RNC and respective node Bs 704 and 706.

In block 904, the process may assign a PDCP sequence number to each of the packets; and in block 906, the process may send the plurality of packets, including the PDCP sequence numbers, to the plurality of RLC entities according to the allocation. Here, the RLC entities 712A and 712B may each process the packets substantially as a conventional RLC layer in a HSDPA network, including adding RLC layer information such as an RLC sequence number. In block 908, the process may transmit a first portion of the plurality of packets from the first RLC entity 712A to a primary serving cell utilizing a first logical channel, and in block 910, the process may transmit a second portion of the plurality of packets from the second RLC entity 712B to a secondary serving cell utilizing a second logical channel. For example, the packets may be sent from the RNC 702 to the node Bs 704 and 706 over respective Iub interfaces as described above.

As described below, with reference to FIG. 8, certain issues may arise with such a multi-link PDCP configuration, particularly relating to out-of-order delivery of packets over the dual RLC streams to the respective RLC entities 714A and 714B at the UE 708. That is, when the multi-link PDCP sublayer 716 at the UE 708 arranges the packets into order according to the PDCP sequence numbers, gaps may naturally occur in the sequence numbers due to skew. In some aspects of the present disclosure, a "gap" may include one or more packets corresponding to one or more PDCP sequence numbers. Further, there may be more than one gap corresponding to a particular node B that forwards packets to the UE. Here, some of the gaps may be caused by skew, while some of the gaps may be caused by failures.

If the skew is not distinguished from packet transmission or decoding failures, unnecessary retransmissions may end up being requested. Aspects of the present disclosure may address these issues with a multi-link PDCP algorithm that takes into account the particular issues of this setup to reduce or eliminate these unnecessary retransmissions.

Figure 8:
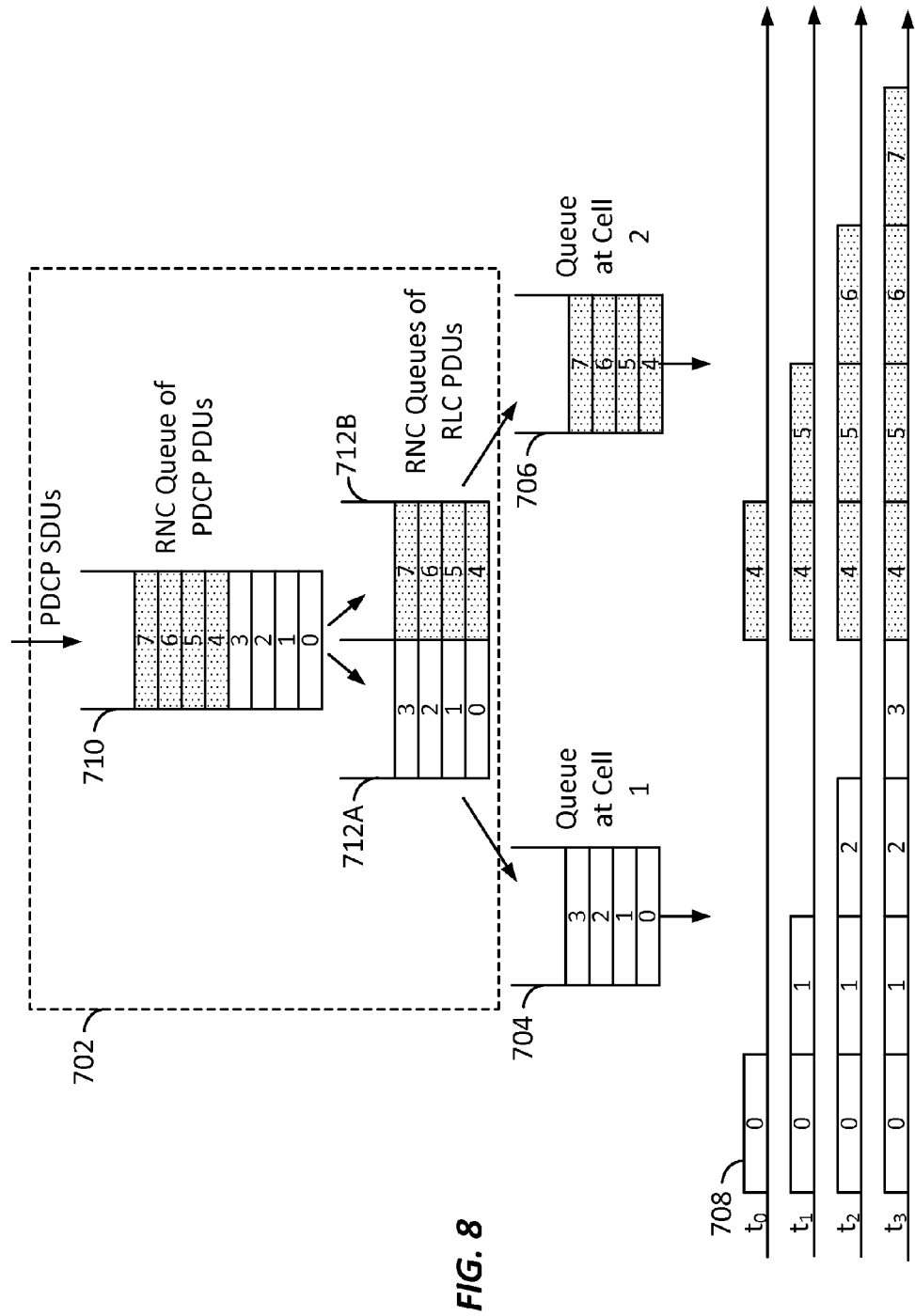
FIG. 8 is a conceptual diagram illustrating a flow of PDCP PDUs on a downlink path from an RNC having a multi-link PDCP layer and a UE.

FIG. 8 is a schematic illustration showing the flow of eight packets from a serving RNC 702 having a multi-link PDCP sublayer 710, through a pair of node Bs 704 and 706, converging at a UE 708. In the illustrated example, 8 PDCP PDUs are shown, labeled 0-7. Here, the SRNC 702 receives the eight PDCP SDUs from higher layers to be sent as PDCP PDUs to the UE 708. The PDCP sublayer 710 assigns a PDCP sequence number to each of the PDCP PDUs, and allocates the packets among the dual RLC entities 712A and 712B at the RNC 702. Further, each of the RLC entities 712A and 712B may assign RLC sequence numbers to the respective packets at the RLC sublayers.

For the purpose of simple explanation, a flow control algorithm at the SRNC 702 allocates the first four packets 0-3 to the first RLC entity 712A at the RNC 702, and the second four packets 4-7 to the second RLC entity 712B at the RNC 702. From the RLC entities the packets are transmitted over respective RLC streams to the corresponding node B 704 or 706. Of course, in various aspects of the present disclosure any suitable flow control algorithm may be utilized to allocate the packets to the respective RLC streams, and the simple illustrated division among the two RLC entities is only utilized for ease of explanation. Further, in various aspects of the present disclosure, the correspondence between the first RLC entity 712A and the first node B 704, and between the second RLC entity 712B and the second node B 706 may not be fixed but may be flexible, such that either RLC entity at the RNC 702 may variously correspond to either one of the node Bs 704 or 706.

At the first node B 704, a queue prepares to send its packets having PDCP sequence numbers 0-3 to the UE 708, and at the second node B 706, a queue prepares to send its packets having PDCP sequence numbers 4-7 to the UE 708. Assuming that the channel conditions at each node B are equivalent, and that cell loading is also equivalent, then at time $t_0$, the UE 708 receives the first packet from each node B, that is, packets having PDCP sequence numbers 0 and 4. In the illustrated example, a first MAC entity at the UE receives packet 0, and a second MAC entity at the UE receives packet 4.

At the UE 708, dual RLC entities 714A and 714B receive the packets from their respective MAC entity. At this time, neither RLC entity detects a gap in RLC sequence numbers, since each RLC entity is only looking at RLC sequence numbers corresponding to its own RLC stream. However, when the packets are sent to the multi-link PDCP sublayer 716, a gap is detected between PDCP sequence numbers 0 and 4. That is, when packets are passed to the multi-link PDCP sublayer 716, the packets are re-ordered in accordance with their respective PDCP sequence numbers in each of the packets. Here, due to skew corresponding to the particular allocation of packets to the respective RLC streams, a gap in PDCP sequence numbers occurs from the perspective of the multi-link PDCP sublayer 716.

In accordance with an aspect of the present disclosure, to address these gaps caused by skew, the multi-link PDCP sublayer 716 at the UE 708 may start a skew timer corresponding to each detected gap in PDCP sequence numbers. The length of the skew timer may be set to any suitable value, and may relate to an expected time for the gap to be filled when the gap is caused by skew rather than packet decoding or transmission failures. As the skew timer runs, at times $t_1$, $t_2$, and $t_3$ illustrated in FIG. 8, additional packets may be received, potentially filling the gap in the PDCP sequence numbers, as illustrated. In various aspects, the skew timer process may be killed, or the timer may be reset, when the gap in PDCP sequence numbers, for which the skew timer was started, is filled. Here, because the skew timer did not expire, the conventional PDCP procedures for passing the data corresponding to the PDCP flow to higher layers may be utilized. However, in an aspect of the present disclosure, if the skew timer expires prior to the filling of the gap in PDCP sequence numbers this may indicate a packet decoding or transmission failure. In this case, the multi-link PDCP entity 716 at the UE 708 may pass all the data packets, up to the PDCP sequence number below which the packets are either received, or a skew timer expired, to the higher layers. In other words, if the gap in PDCP sequence numbers is not filled before the skew timer expires, all the data up to that gap may be passed.

That is, in an aspect of the disclosure, the multi-link PDCP sublayer 716 may not need to incorporate any additional feedback beyond the feedback utilized at the RLC layer or other feedback utilized in a conventional HSDPA system. Although the introduction of feedback into the PDCP mechanism might provide some benefits in terms of requesting retransmissions of packets if needed according to the expiration of the skew timer, the introduction of the feedback at the PDCP sublayer would introduce complications and the need for changes to existing specifications that might be undesirable. Further, because the RLC sublayer incorporates its own feedback mechanism and may request retransmissions at the RLC layer when gaps are detected there, the incidence of gaps at the PDCP sublayer may be relatively low.

Figure 10:
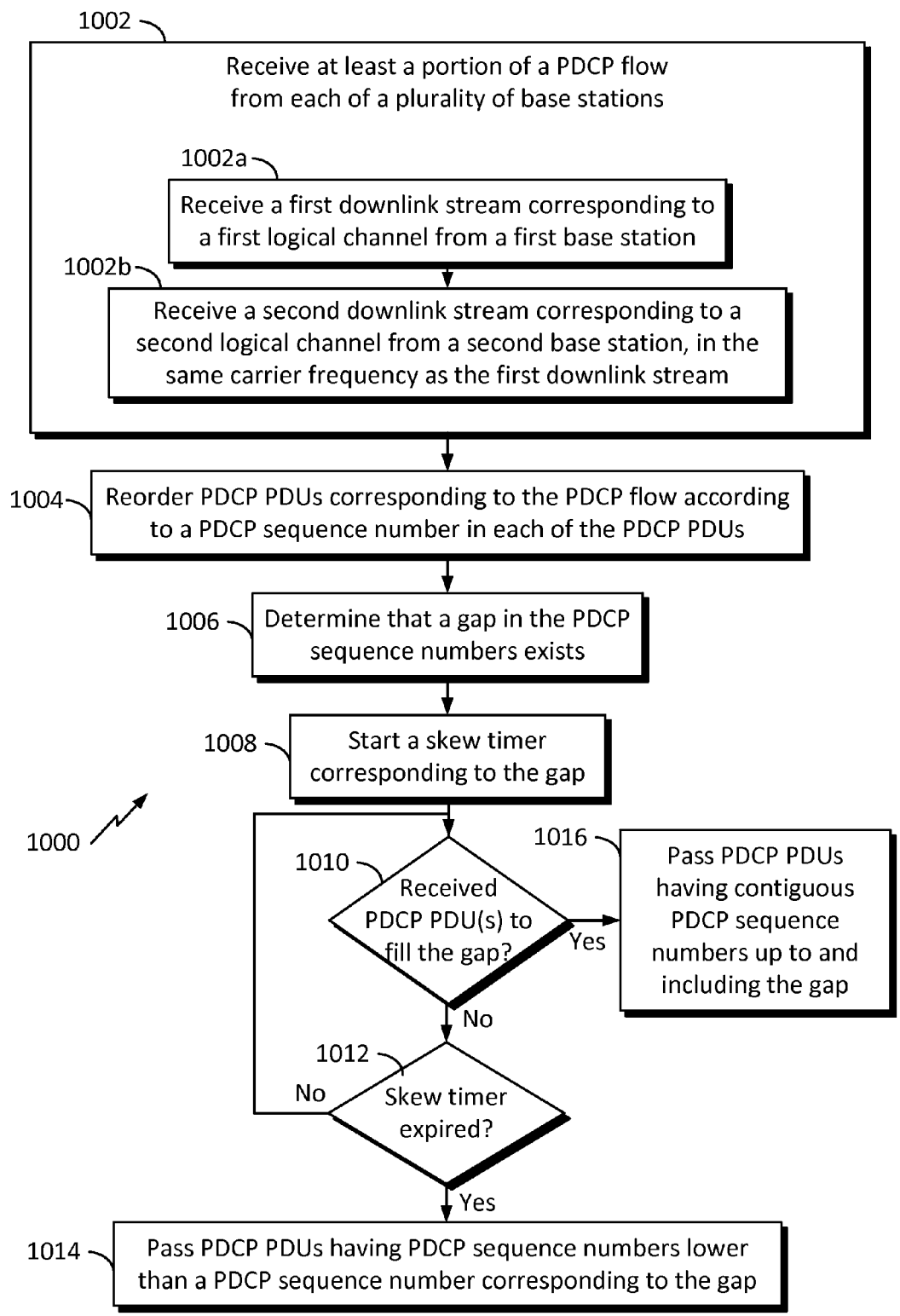
FIG. 10 is a flow chart illustrating an exemplary process of receiving and processing PDCP PDUs at a UE in a multi-point HSDPA network utilizing a multi-link PDCP.

FIG. 10 is a flow chart illustrating an exemplary process 1000 for multi-point HSDPA utilizing a multi-link PDCP sublayer, operable at a user equipment such as the UE 708 in accordance with some aspects of the present disclosure. That is, in some examples, the process 1000 may be performed by the UE 708, or by any suitable user equipment capable of implementing multi-point HSDPA. Further, the process 1000 may be implemented by a processor 104 configured to perform the below-recited functions. In one non-limiting example described below, the process may be implemented by a PDCP sublayer of a UE configured to receive packets in a multi-point HSDPA wireless communication system.

In block 1002, the process may receive at least a portion of a PDCP flow from each of a plurality of base stations. For example, the receiving of the PDCP flow may include block 1002a, wherein the UE receives a first downlink stream from a first base station, and block 1002b, wherein the UE receives a second downlink stream from a second base station, in substantially the same carrier frequency as the first downlink stream. Here, the respective downlink streams may correspond to portions of a first logical channel, between the UE and the RLC, which includes the first base station, and a second logical channel, between the UE and the RLC, which includes the second base station.

In block 1004, the PDCP entity at the UE may reorder PDCP PDUs corresponding to the PDCP flow according to a PDCP sequence number in each of the PDCP PDUs. As described above, the reordering of the PDCP PDUs may result in some gaps in the PDCP sequence numbers that may be caused by skew, or by a packet transmission or decoding failure. Thus, in block 1006, the PDCP entity a the UE may determine that a gap in the PDCP sequence numbers exists. Based on this determination, in block 1008 the PDCP entity at the UE may start a skew timer corresponding to the gap.

As the skew timer started in block 1008 runs, additional PDCP PDUs may arrive at the PDCP entity in the UE, and the PDCP entity at the UE may re-order those PDUs as done in block 1004. Thus, in block 1010, the PDCP entity may determine whether any received PDCP PDUs have PDCP sequence numbers that would fill the gap. If the gap is filled, then in block 1016, the PDCP entity may pass the PDCP PDUs having contiguous PDCP sequence numbers up to and including the gap to higher layers. If the gap is not filled, then in block 1012 the PDCP entity may determine whether the skew timer corresponding to the gap, started in block 1008, has expired. If the skew timer has not yet expired, the process may continue, possibly receiving PDCP PDUs which might fill the gap. If, however, the process determines in block 1012 that the skew timer has expired, then in block 1014 the PDCP entity at the UE may pass PDCP PDUs having PDCP sequence numbers lower than a PDCP sequence number corresponding to the gap. In this way, although there may remain a gap in the PDCP sequence numbers, the queue of received packets at the PDCP entity may be flushed and the multi-point HSDPA system may continue to receive packets.

As discussed above, an HSDPA system may manage the active set for a particular UE by utilizing certain mobility events, determined in accordance with UE measurements of characteristics of pilot channels transmitted by respective cells. In accordance with an aspect of the present disclosure, when utilized in conjunction with the multi-link PDCP, additional considerations with respect to the plural RLC streams managed by the multi-link PDCP sublayer 710 may be taken into account.

For example, referring again to FIG. 7, assume that a single HSDPA link is established between the first node B 704 and the UE 708. At this time, in accordance with the characteristics of a pilot transmitted by the second node B 706, an Event 1A measurement event may be utilized to add the second node B 706 as a secondary serving cell for multi-point HSDPA. Here, the measurement event should not cause any loss of data, since any packets already in transit for the PDCP flow from the RNC 702 to the UE 708 can continue, and a new allocation of packets by the PDCP entity 710 between the dual RLC streams can commence.

Further, if it is assumed that the multi-point HSDPA link is established between the Node Bs 704 and 706 and the UE 708, in accordance with the characteristics of the pilots transmitted by the respective node Bs 704 and 706, an Event 1D measurement event may be utilized to swap the place of the primary serving cell and the secondary serving cell. That is, if the second node B 706 becomes the best cell for the UE 708, it may make sense to utilize the second node B 706 as the primary serving cell, while utilizing the first node B 704 as the secondary serving cell. Here, the swap may take place without loss of data, since any packets in transit from the respective Node Bs to the UE may continue, and the PDCP entity 710 at the RNC 702 can simply modify, if necessary, its allocation of data packets among the respective RLC streams in accordance with the swap.

In an aspect of the present disclosure, the Event 1B measurement event can be utilized to eliminate the secondary serving cell in a multi-point HSDPA system that includes the multi-link PDCP sublayer 710. However, in this instance, the existing data in transit over the secondary serving cell may be lost. That is, due to the lack of feedback at the PDCP sublayer, recovery of the data lost from the secondary serving cell after it is eliminated may be difficult. Therefore, in accordance with an aspect of the present disclosure, queue transfer between the RLC streams by the multi-link PDCP sublayer 710 at the RNC 702 may be enabled.

For example, referring again to FIG. 8, assume that the first node B 704 is the primary serving cell, and the second node B 706 is the secondary serving cell. Here, the PDCP sublayer may allocate the packets having PDCP sequence numbers 0-3 to a queue at the first RLC entity 712A, to be transmitted over the corresponding Iub interface to the first node B 704. Here, the packets 0-3 may include a designation for a first logical channel corresponding to the first RLC entity 712A, and may further include an RLC sequence number designated therein. Similarly, packets having PDCP sequence numbers 4-7 may be allocated to a queue at the second RLC entity 712B, to be transmitted over the corresponding Iub interface to the second node B 706. Here, the packets 4-7 may include a designation for a second logical channel corresponding to the second RLC entity 712B, and may further include an RLC sequence number designated therein.

As these packets are in transit, it may occur that the secondary serving cell is to be eliminated in accordance with an Event 1B measurement event. That is, the UE 708 may provide certain measurement reporting messages on uplink transmissions. Based on these measurements, the network may make a decision to eliminate the secondary serving cell from serving the UE. Here, it may be possible to lose the packets 4-7 in transit over the secondary serving cell.

In accordance with an aspect of the present disclosure, the RNC 702 may retain knowledge of which packets were allocated to the second RLC entity 712B, corresponding to the secondary serving cell, by the PDCP sublayer 710. Thus, having this information, in a further aspect of the present disclosure, the RNC 702 may duplicate packets 4-7 and re-send those duplicated packets over the primary serving cell. That is, the packets that were queued at the second RLC entity 712B to be transmitted over the secondary serving cell utilizing the second logical channel may be duplicated and requeued at the first RLC entity 712A to be transmitted over the primary serving cell utilizing the first logical channel. That is, these requeued packets may be designated for the first logical channel, even though the earlier transmission was designated for the second logical channel. Being requeued at the first RLC entity 712A, the requeued packets may include an RLC sequence number designated by the first RLC entity 712A. Further, when the packets are transmitted over the first Iub interface to the first node B 704, the requeued packets may be marked as new packets, or in an aspect of the present disclosure, they may be marked as retransmitted packets. In the case that the requeued packets are marked as retransmitted packets, they may be granted increased priority over new packets, helping to ensure they are transmitted over the air interface more promptly. In this fashion, the loss of packets that may otherwise occur in association with the Event 1B measurement event may be reduced or eliminated.

Here, the network may instruct the secondary serving cell 706 to eliminate the data from its buffers, or the network may instruct the secondary serving cell 706 simply not to transmit the data. In some aspects of the disclosure, the secondary serving cell 706 may be enabled to continue transmitting queued packets until they are all transmitted. That is, if the buffers at the secondary serving cell 706 are not cleared, upon the eventual occurrence of the event 1B, the data will be eliminated in any case.

Figure 11:
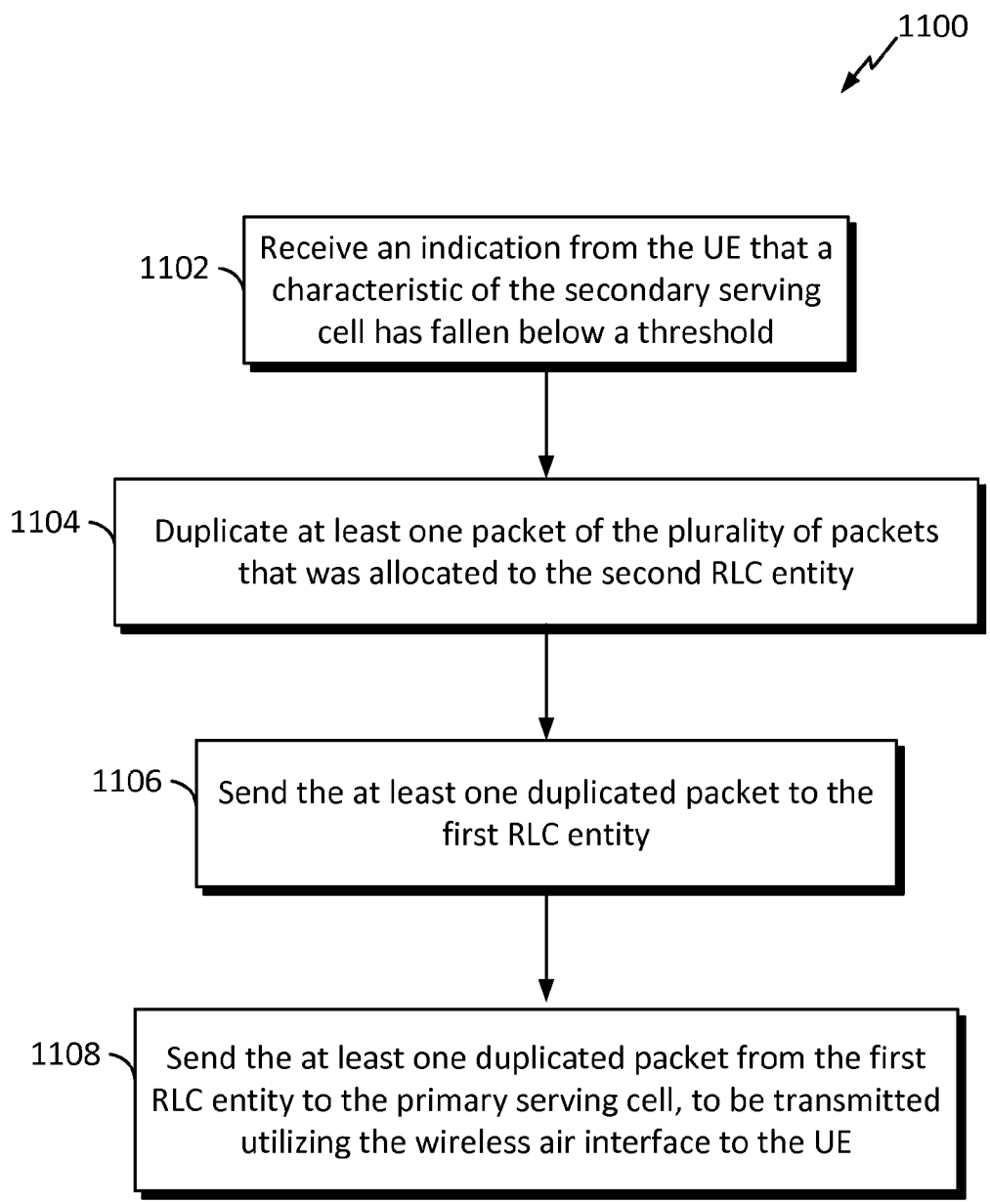
FIG. 11 is a flow chart illustrating an exemplary process of handling an event 1B measurement event by utilizing queue transfer, operable at a network node such as the RNC.

FIG. 11 is a flow chart illustrating an exemplary process 1100 for wireless communication utilizing queue transfer as described above, operable at a network node such as the RNC 702 in accordance with some aspects of the present disclosure. Here, process 1100 may be a continuation of the process 900 illustrated in FIG. 9. That is, the process 1100 may be implemented in a multi-point HSDPA system wherein a plurality of packets, allocated from a single PDCP entity to a plurality of RLC entities at the RNC, are sent to a corresponding plurality of base stations to be transmitted over a wireless air interface to a UE. Here, the plurality of base stations may include a primary serving cell and a secondary serving cell, as described above in relation to FIG. 7, which illustrated a first node B 704 which may act as a primary serving cell, and a second node B 706 which may act as a secondary serving cell.

In block 1102, the RNC may receive an indication from the UE that a characteristic of the secondary serving cell has fallen below a threshold. For example, an $E_c/I_0$ of a pilot channel transmitted by the second node B acting as the secondary serving cell may have fallen below a certain threshold as determined by the UE. Here, the UE may send an RRC message including an indication of event 1B. In response to the indication received in block 1102, the RNC may determine to eliminate the secondary serving cell.

Thus, in block 1104, the PDCP sublayer of the RNC may duplicate at least one packet of the plurality of packets that was allocated to the second RLC entity. For example, referring again to FIG. 7, the multi-link PDCP entity 710 may duplicate a packet that had been allocated to the second RLC entity 712B corresponding to the second RLC stream including the second node B 706, since in accordance with the determination to eliminate the secondary serving cell, corresponding to the second node B 706, this packet is unlikely to be received at the UE 708. Therefore, in block 1106 the PDCP entity may send the at least one duplicated packet to the first RLC entity. Referring again to FIG. 7, the packet duplicated in block 1104 may be sent to the first RLC entity 712A corresponding to the first RLC stream including the first node B 704, acting as the primary serving cell. In block 1108, the first RLC entity 712A may send the at least one duplicated packet from the first RLC entity to the primary serving cell, to be transmitted utilizing the wireless air interface to the UE.

In another aspect of the present disclosure, flexible RLC-to-MAC-ehs mapping may be utilized to address the potential loss of packets associated with the event 1B measurement event. That is, the assignment of packets from each RLC 712A and 712B at the RNC 702 may be flexible, in that those packets may be sent to either cell, i.e., the primary serving cell 704 or the secondary serving cell 706.

That is, in accordance with an aspect of the present disclosure, the multi-link PDCP sublayer 710 at the RNC 702 may manage the RLC sublayers 712A and 712B corresponding to the RLC streams utilized in the multi-point HSDPA transmission. The RLC sublayers 712A and 712B are each configured to provide the packets allocated to them, to one of the node Bs 704 or 706 for transmission to the UE 708. Here, if one of these RLC streams is eliminated due to the event 1B measurement event, there is a desire to recover the packets in transit on that eliminated stream. Thus, the mapping of one or more of the RLC streams to a particular node B 704 or 706 may be flexible, capable of being mapped to more than one of the node Bs.

In this way, if the event 1B measurement event occurs and the secondary serving cell 706 is eliminated, the RLC sublayer 714B at the UE 708 will see gaps in the RLC sequence numbers corresponding to the packets lost in transit. In this case, the UE 708 may request retransmissions of the lost packets by, for example, utilizing the RLC status PDU.

In accordance with an aspect of the present disclosure, flexible mapping of the RLC stream to a different node B can enable the retransmission of the packet to occur through the remaining, primary serving cell. That is, although the packet was transmitted utilizing the secondary serving cell 706, because the secondary serving cell was eliminated due to the event 1B, retransmissions of the same packet can be sent over the primary serving cell 704.

Here, in some aspects of the disclosure, it may be that only one of the plural RLC sublayers 712A or 712B is enabled for flexible mapping. For example, during a steady state, i.e., at a time when dual cell multipoint HSDPA transmissions are occurring, the first RLC sublayer 712A may be mapped to the primary serving cell 704 and the second RLC sublayer 712B may be mapped to the secondary serving cell 706. However, during an event 1B, which drops the secondary serving cell, the second RLC sublayer 712B, which is utilized for the secondary serving cell, may be enabled to have flexible mapping to different node Bs. In this way, as described above, when the event 1B measurement event occurs, retransmissions requested by the UE 708 for packets lost in transit may be provided by that same second RLC sublayer 712B over the primary serving cell 704.

Figure 12:
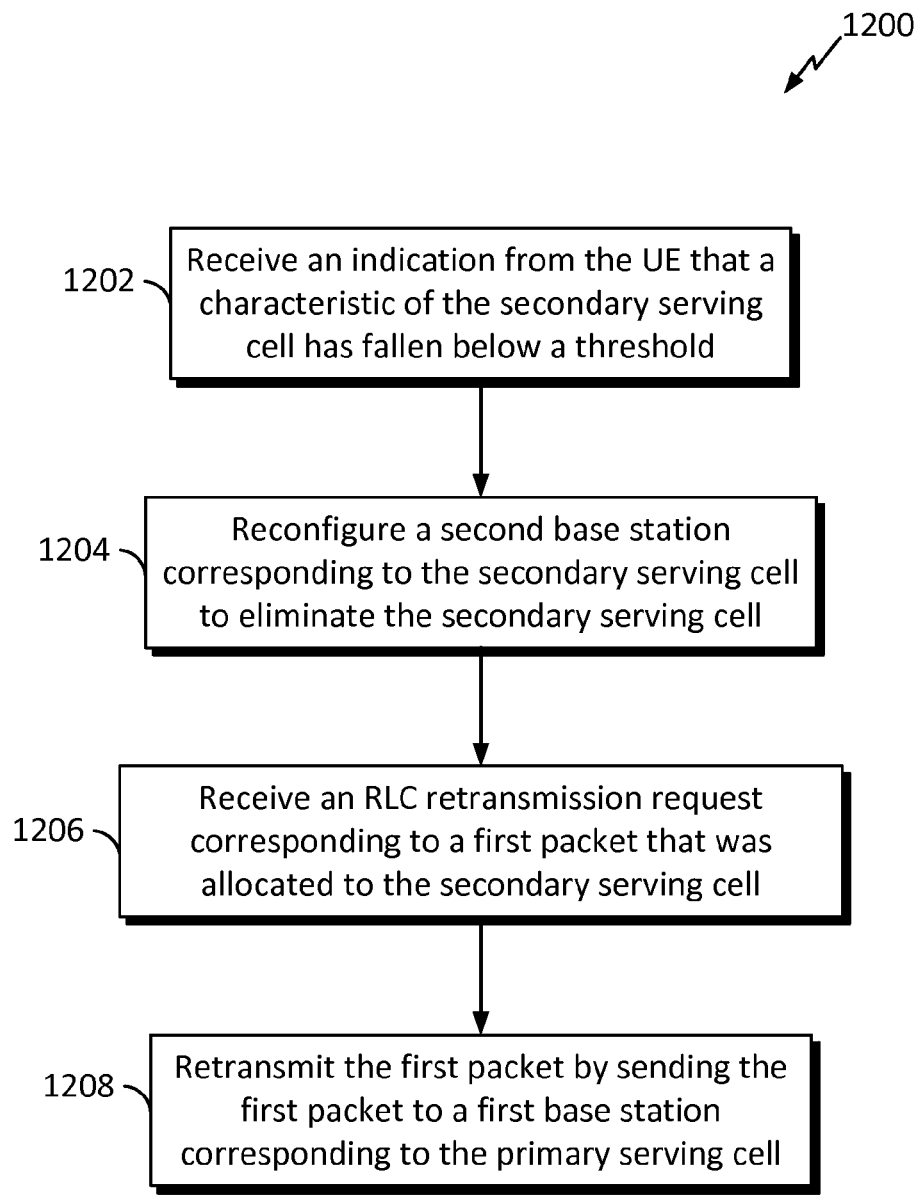
FIG. 12 is a flow chart illustrating an exemplary process of handling an event 1B measurement event by utilizing flexible RLC-to-MAC-ehs mapping, operable at a network node such as the RNC.

FIG. 12 is a flow chart illustrating an exemplary process 1200 for wireless communication utilizing flexible RLC-to-MAC-ehs mapping as described above, operable at a network node such as the RNC 702 in accordance with some aspects of the present disclosure. Here, process 1200 may be a continuation of the process 900 illustrated in FIG. 9. That is, the process 1100 may be implemented in a multi-point HSDPA system wherein a plurality of packets, allocated from a single PDCP entity to a plurality of RLC entities at the RNC, are sent to a corresponding plurality of base stations to be transmitted over a wireless air interface to a UE. Here, the plurality of base stations may include a primary serving cell and a secondary serving cell, as described above in relation to FIG. 7, which illustrated a first node B 704 which may act as a primary serving cell, and a second node B 706 which may act as a secondary serving cell.

In block 1202, the RNC may receive an indication from the UE that a characteristic of the secondary serving cell has fallen below a threshold. For example, an $E_c/I_0$ of a pilot channel transmitted by the second node B acting as the secondary serving cell may have fallen below a certain threshold as determined by the UE. Here, the UE may send an RRC message including an indication of event 1B. In response to the indication received in block 1202, the RNC may determine to eliminate the secondary serving cell.

Thus, in block 1204, the RNC may reconfigure a second node B corresponding to the secondary serving cell to eliminate the secondary serving cell. For example, NBAP signaling may be utilized between the RNC and the second node B 706 to eliminate the secondary serving cell.

Here, an RLC entity at the UE may detect a gap in RLC sequence numbers, because the secondary serving cell has been eliminated. In this case, the RLC entity at the UE may send a retransmission request of the packets corresponding to the gap to the RNC. Thus, in block 1206, the RNC may receive the RLC retransmission request corresponding to a first packet that was allocated to the RLC entity corresponding to the secondary serving cell. In response, in block 1208, the RNC may retransmit the first packet by sending the first packet to a first base station corresponding to the primary serving cell. That is, the second RLC entity 712B at the RNC may be enabled to send packets such as the first packet to the first node B 704. In this way, by enabling flexible RLC-to-MAC-ehs mapping for at least the second RLC entity 712B, the packets allocated to the second RLC entity 712B can be provided to the UE 708 in spite of the elimination of the secondary serving cell in the multi-point HSDPA network. That is, enabling retransmissions of packets allocated to the second RLC entity 712B by way of the first node B 704 can reduce packet loss in the case of the event 1B measurement event.

Figure 13:
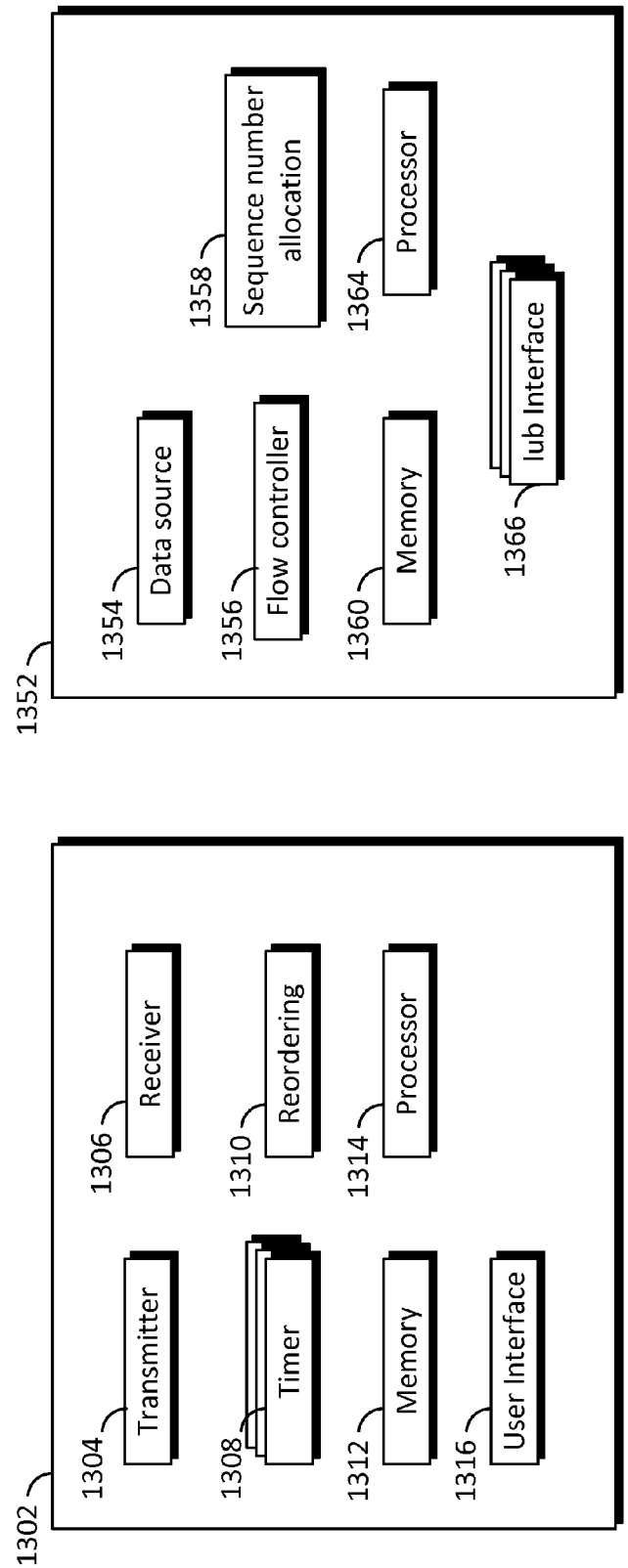
FIG. 13 is a block diagram illustrating a UE in communication with an RNC.

FIG. 13 is a simplified block diagram illustrating an exemplary UE 1302 in communication with an exemplary RNC 1352 in accordance with some aspects of the present disclosure. Here, the UE 1302 may be the same as the UE 210 illustrated in FIG. 2, the UE 610 illustrated in FIG. 6, the UE 708 illustrated in FIG. 7, or any suitable user equipment capable of multi-point HSDPA communication utilizing a multi-link PDCP sublayer. Here, the UE 1302 may include a transmitter 1304 for transmitting an uplink signal, and a receiver 1306 for receiving a downlink signal. Further, the UE 1302 may include a processor 1314 and a memory 1312 coupled to the processor 1314. The processor may be the same as the processing system 114 or the processor 104 illustrated in FIG. 1, or any other processor suitable for processing packets. The UE 1302 may further include a user interface 1316, which may include elements such as a display device, a keyboard, etc.

The UE 1302 may further include a reordering entity 1310 for reordering packets in accordance with sequence numbers assigned to the packets. Still further, the UE 1302 may include one or more timers 1308, which may be configured to start upon the detection of a PDCP sequence number gap after reordering of the packets by the reordering entity 1310.

The RNC 1352 may be the same as the RNC 206 illustrated in FIG. 2, the RNC 702 illustrated in FIG. 7, or any suitable RNC capable of multi-point HSDPA communication utilizing a multi-link PDCP sublayer. Here, the RNC 1352 may include a data source 1354, which may include higher layers above the PDCP sublayer. Further the RNC 1352 may include a flow controller for allocating packets from the PDCP entity among a plurality of RLC entities, and a sequence number allocation entity 1358 for assigning a PDCP sequence number to each of the packets. The RNC 1352 may further include one or more Iub interfaces 1356 for sending packets to respective base stations over respective logical links. Still further, the RNC 1352 may include a processor 1364 and a memory 1360 coupled to the processor 1364. Here, the processor may be the same as the processing system 114 or the processor 104 illustrated in FIG. 1, or any other processor suitable for processing packets.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA.

Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication operable at a user equipment, comprising:
   receiving at least a portion of a multi-link packet data convergence protocol (PDCP) flow from each of a plurality of base stations;
   reordering PDCP protocol data units (PDUs) corresponding to the multi-link PDCP flow according to a PDCP sequence number in each of the PDCP PDUs to form a queue of received PDCP PDUs;
   determining that a gap in the PDCP sequence numbers exists in the queue of received PDCP PDUs;
   starting a skew timer based on determining that the gap exists;
   passing, to one or more upper layers from the queue of received PDCP PDUs, PDCP PDUs having contiguous PDCP sequence numbers lower than a PDCP sequence number corresponding to the gap, when the skew timer corresponding to the gap expires; and
   flushing, from the queue of received PDCP PDUs, PDCP PDUs having PDCP sequence numbers higher than the PDCP sequence number corresponding to the gap, without passing the PDCP PDUS having the PDCP sequence numbers higher than the PDCP sequence number corresponding to the gap to the one or more upper layers.

2. The method of claim 1, further comprising:
   receiving at least one PDCP PDU having a sequence number corresponding to the gap, to fill the gap; and
   passing PDCP PDUs having contiguous PDCP sequence numbers up to and including the gap in the PDCP sequence numbers when the gap is filled.

3. The method of claim 1, wherein the receiving of the at least a portion of the multi-link PDCP flow from each of the plurality of base stations comprises:
   receiving a first downlink stream from a first base station; and
   receiving a second downlink stream from a second base station, in substantially the same carrier frequency as the first downlink stream.

4. The method of claim 3, further comprising:
   determining that a measurement of the second downlink stream has fallen below a threshold;
   transmitting a request corresponding to the measurement; and
   switching off a multi-point high speed downlink packet access (HSDPA) mode such that the second downlink stream is not received from the second base station.

5. The method of claim 4, wherein the request corresponding to the measurement comprises an indication that a cell corresponding to the second base station is suitable for removal from an active set.

6. The method of claim 4, further comprising:
   determining that a gap in radio link control (RLC) sequence numbers corresponding to the second downlink stream exists;
   requesting a retransmission of at least one packet corresponding to the gap in the RLC sequence numbers; and
   receiving a retransmission of the at least one packet corresponding to the gap over the first downlink stream from the first base station.

7. The method of claim 3, wherein the first downlink stream corresponds to a first logical channel between the user equipment and a radio network controller, and wherein the second downlink stream corresponds to a second logical channel between the user equipment and the radio network controller.

8. The method of claim 3, wherein the first base station is configured to provide a primary serving cell associated with the user equipment and the second base station is configured to provide a secondary serving cell associated with the user equipment.

9. The method of claim 8, wherein the primary serving cell facilitates a first logical channel between the user equipment and a radio network controller, and wherein the secondary serving cell facilitates a second logical channel between the user equipment and a radio network controller.

10. A user equipment configured for wireless communication, comprising:
    means for receiving at least a portion of a multi-link packet data convergence protocol (PDCP) flow from each of a plurality of base stations;
    means for reordering PDCP protocol data units (PDUs) corresponding to the multi-link PDCP flow according to a PDCP sequence number in each of the PDCP PDUs to form a queue of received PDCP PDUs;
    means for determining that a gap in the PDCP sequence numbers exists in the queue of received PDCP PDUs;
    means for starting a skew timer based on determining that the gap exists;
    means for passing, to one or more upper layers from the queue of received PDCP PDUs, PDCP PDUs having contiguous PDCP sequence numbers lower than a PDCP sequence number corresponding to the gap, when the skew timer corresponding to the gap expires; and means for flushing, from the queue of received PDCP PDUs, PDCP PDUs having PDCP sequence numbers higher than the PDCP sequence number corresponding to the gap, without passing the PDCP PDUS having the PDCP sequence numbers higher than the PDCP sequence number corresponding to the gap to the one or more upper layers.

11. A non-transitory computer-readable medium storing computer-executable code, comprising:
   code for causing a computer to receive at least a portion of a multi-link packet data convergence protocol (PDCP) flow from each of a plurality of base stations;
   code for causing the computer to reorder PDCP protocol data units (PDUs) corresponding to the multi-link PDCP flow according to a PDCP sequence number in each of the PDCP PDUs to form a queue of received PDCP PDUs;
   code for causing the computer to determine that a gap in the PDCP sequence numbers exists in the queue of received PDCP PDUs;
   code for causing the computer to start a skew timer based on determining that the gap exists; and
   code for causing the computer to pass, to one or more upper layers from the queue of received PDCP PDUs, PDCP PDUs having contiguous PDCP sequence numbers lower than a PDCP sequence number corresponding to the gap, when the skew timer corresponding to the gap expires; and
   code for causing the computer to flush, from the queue of received PDCP PDUs, PDCP PDUs having PDCP sequence numbers hi her than the PDCP sequence number corresponding to the gap, without passing the PDCP PDUS having the PDCP sequence numbers higher than the PDCP sequence number corresponding to the gap to the one or more upper layers.

12. A user equipment configured for wireless communication, comprising:
   a receiver for receiving downlink transmissions from at least one base station;
   a transmitter for transmitting uplink transmissions to the at least one base station;
   at least one processor for controlling the receiver and the transmitter; and
   a memory coupled to the at least one processor,
   wherein the at least one processor is configured to:
      receive at least a portion of a multi-link packet data convergence protocol (PDCP) flow from each of a plurality of base stations;
      reorder PDCP protocol data units (PDUs) corresponding to the multi-link PDCP flow according to a PDCP sequence number in each of the PDCP PDUs to form a queue of received PDCP PDUs;
      determine that a gap in the PDCP sequence numbers exists in the queue of received PDCP PDUs;
      start a skew timer based on determining that the gap exists;
      pass, to one or more upper layers from the queue of received PDCP PDUs, PDCP PDUs having contiguous PDCP sequence numbers lower than a PDCP sequence number corresponding to the gap, when the skew timer corresponding to the gap expires; and
      flush, from the queue of received PDCP PDUs, PDCP PDUs having PDCP sequence numbers higher than the PDCP sequence number corresponding to the gap, without passing the PDCP PDUS having the PDCP sequence numbers higher than the PDCP sequence number corresponding to the gap to the one or more upper layers.

13. The user equipment of claim 12, wherein the at least one processor is further configured to:
   receive at least one PDCP PDU having a sequence number corresponding to the gap, to fill the gap; and
   pass PDCP PDUs having contiguous PDCP sequence numbers up to and including the gap in the PDCP sequence numbers when the gap is filled.

14. The user equipment of claim 12, wherein the receiving of the at least a portion of the multi-link PDCP flow from each of the plurality of base stations comprises:
   receiving a first downlink stream from a first base station; and
   receiving a second downlink stream from a second base station, in substantially the same carrier frequency as the first downlink stream.

15. The user equipment of claim 14, wherein the at least one processor is further configured to:
   determine that a measurement of the second downlink stream has fallen below a threshold;
   transmit a request corresponding to the measurement; and
   switch off a multi-point high speed downlink packet access (HSDPA) mode such that the second downlink stream is not received from the second base station.

16. The user equipment of claim 15, wherein the request corresponding to the measurement comprises an indication that a cell corresponding to the second base station is suitable for removal from an active set.

17. The user equipment of claim 15, wherein the at least one processor is further configured to:
   determine that a gap in radio link control (RLC) sequence numbers corresponding to the secondary stream exists;
   request a retransmission of at least one packet corresponding to the gap in the RLC sequence numbers; and
   receive a retransmission of the at least one packet corresponding to the gap over the first downlink stream from the first base station.

18. The user equipment of claim 14, wherein the first downlink stream corresponds to a first logical channel between the user equipment and a radio network controller, and wherein the second downlink stream corresponds to a second logical channel between the user equipment and the radio network controller.

19. The user equipment of claim 14, wherein the first base station is configured to provide a primary serving cell associated with the user equipment and the second base station is configured to provide a secondary serving cell associated with the user equipment.

20. The user equipment of claim 19, wherein the primary serving cell facilitates a first logical channel between the user equipment and a radio network controller, and wherein the secondary serving cell facilitates a second logical channel between the user equipment and a radio network controller.

* * * * *